US011054252B2

(12) United States Patent
Irie et al.

(10) Patent No.: US 11,054,252 B2
(45) Date of Patent: Jul. 6, 2021

(54) THICKNESS MEASUREMENT METHOD, THICKNESS MEASUREMENT DEVICE, DEFECT DETECTION METHOD, AND DEFECT DETECTION DEVICE

(71) Applicant: Panasonic Intellectual Property Management Co., Ltd., Osaka (JP)

(72) Inventors: Yousuke Irie, Nara (JP); Hirotsugu Inoue, Tokyo (JP); Shogo Tokunaga, Tokyo (JP); Yu Kurokawa, Tokyo (JP); Takuya Niioka, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 420 days.

(21) Appl. No.: 16/047,373

(22) Filed: Jul. 27, 2018

(65) Prior Publication Data

US 2018/0372487 A1 Dec. 27, 2018

Related U.S. Application Data

(63) Continuation of application No. PCT/JP2016/004734, filed on Oct. 27, 2016.

(30) Foreign Application Priority Data

Jan. 29, 2016 (JP) .............................. JP2016-016251

(51) Int. Cl.
*G01B 21/08* (2006.01)
*G01N 25/72* (2006.01)
(Continued)

(52) U.S. Cl.
CPC ........... *G01B 21/08* (2013.01); *G01B 21/085* (2013.01); *G01J 5/025* (2013.01); *G01J 5/48* (2013.01);
(Continued)

(58) Field of Classification Search
CPC ................ G01B 21/08; G01B 21/085; G01J 2005/0081; G01N 25/18; G01N 25/72; G06T 2207/10048; G06T 2207/30108
See application file for complete search history.

(56) References Cited

U.S. PATENT DOCUMENTS

2002/0128797 A1* 9/2002 Sun ..................... G01B 11/22
702/172
2005/0186327 A1* 8/2005 Saito ..................... G01N 25/72
427/8

(Continued)

FOREIGN PATENT DOCUMENTS

JP 2011-122859 6/2011
JP 2014-32160 2/2014

OTHER PUBLICATIONS

Extended European Search Report dated Oct. 24, 2018 in European Application No. 16887840.3.
(Continued)

*Primary Examiner* — Michael J Dalbo
(74) *Attorney, Agent, or Firm* — Wenderoth, Lind & Ponack, L.L.P.

(57) ABSTRACT

Method for measuring a depth of a defect inside an inspection object is provided. The method comprises steps of: generating thermal image data corresponding to a temperature of a surface of the inspection object by photographing a heated surface of the inspection object at a predetermined time interval by a photographing device; obtaining a temperature curve showing a temporal change in temperature of the surface of the inspection object based on the thermal image data; fitting a theoretical equation obtained from a heat conduction equation including a parameter related to the depth of the defect of the inspection object to the temperature curve to obtain a theoretical curve showing a temporal change in temperature of the surface of the inspec- (Continued)

tion object; and obtaining the depth of the defect of the inspection object based on a value of the parameter in the theoretical equation corresponding to the theoretical curve.

6 Claims, 19 Drawing Sheets

(51) Int. Cl.
  *G01J 5/48*  (2006.01)
  *G01J 5/02*  (2006.01)
  *G01N 25/18* (2006.01)
  *G01J 5/00*  (2006.01)

(52) U.S. Cl.
  CPC ............. *G01N 25/18* (2013.01); *G01N 25/72* (2013.01); *G01J 2005/0077* (2013.01); *G01J 2005/0081* (2013.01); *G06T 2207/10048* (2013.01); *G06T 2207/30108* (2013.01)

(56) References Cited

U.S. PATENT DOCUMENTS

2007/0041422 A1* 2/2007 Shepard ............... G01N 21/171
  374/124
2014/0153608 A1* 6/2014 Zeng .................... G01B 21/085
  374/5

OTHER PUBLICATIONS

Communication pursuant to Article 94(3) EPC dated Oct. 15, 2019 in corresponding European Patent Application No. 16887840.3.
International Search Report dated Jan. 24, 2017 in International (PCT) Application No. PCT/JP2016/004734.
Horatio Scott et al., "Conduction of Heat in Solids", Second Edition, Oxford University Press, 1959, pp. 93-132.
International Preliminary Report on Patentability dated Jul. 31, 2018 in International (PCT) Application No. PCT/JP2016/004734.
Communication pursuant to Article 94(3) EPC in corresponding European Patent Application No. 16887840.3.

\* cited by examiner

|   | CALCULATED VALUE | FITTING RESULT |
|---|---|---|
| a | – | 0.09293663 |
| b | 0.43022 | 0.341469 |

|   | ACTUAL VALUE | MEASUREMENT RESULT |
|---|---|---|
| L[mm] | 15 | 16.84 |

# THICKNESS MEASUREMENT METHOD, THICKNESS MEASUREMENT DEVICE, DEFECT DETECTION METHOD, AND DEFECT DETECTION DEVICE

TECHNICAL FIELD

The present disclosure relates to a method and a device for measuring a thickness of a measurement object, and a method and a device for detecting a defect of an inspection object.

BACKGROUND

Japanese Laid-Open Patent Publication No. 2011-122859 discloses a defect diagnosis method (defect detection method) enabling measurement of a depth from a surface of a defect such as a separation or a cavity in a structure (inspection object) by using an infrared thermography method. The infrared thermography method is a method of detecting a depth of a defect by an infrared camera (photographing device) capturing a change in surface temperature caused by interruption of thermal migration due to a thermal insulation property of the defect such as a separation or a cavity inside a structure. The infrared thermography method requires heating or cooling a structure for causing thermal migration inside the structure. Methods of heating/cooling include an active method using a heating device such as a heater or a lamp and a passive method using solar radiation or natural air cooling.

The defect diagnosis method (defect detection method) of measuring a defect depth inside a structure (inspection object) is applicable to a thickness measurement method of measuring a thickness of a measurement object.

SUMMARY

The passive method relies on solar radiation or natural air cooling and therefore requires a long time for obtaining a temperature difference on a surface of an inspection object. The active method generally includes sufficient heating to the extent that a temperature difference can be comprehended in a thermal image generated by an infrared camera before measuring a depth of a defect inside an inspection object based on the thermal image acquired by photographing a temperature difference occurring during natural cooling, and therefore requires a relatively long time as well.

The present disclosure provides a thickness measurement method, a thickness measurement device, a defect detection method, and a defect detection device enabling shortening of a measurement time.

Means for Solving Problem

A thickness measurement method according to the present disclosure is a thickness measurement method for measuring a thickness of a measurement object, comprising the steps of: heating a surface of the measurement object by a heating device; generating thermal image data corresponding to a temperature of the surface of the measurement object by photographing the heated surface of the measurement object at a predetermined time interval by a photographing device; obtaining a temperature curve showing a temporal change in temperature of the surface of the measurement object based on the thermal image data generated by the photographing device; fitting a theoretical equation obtained from a heat conduction equation including a parameter related to the thickness of the measurement object to the temperature curve to obtain a theoretical curve showing a temporal change in temperature of the surface of the measurement object; and obtaining the thickness of the measurement object based on a value of the parameter included in the theoretical equation corresponding to the theoretical curve.

A thickness measurement device according to the present disclosure is a thickness measurement device for measuring a thickness of a measurement object, comprising: an input unit that inputs thermal image data generated by photographing a heated surface of the measurement object at a predetermined time interval; a first arithmetic unit that obtains a temperature curve showing a temporal change in temperature of the surface of the measurement object based on the thermal image data; a fitting unit that fits a theoretical equation obtained from a heat conduction equation including a parameter related to the thickness of the measurement object to the temperature curve to obtain a theoretical curve showing a temporal change in temperature of the surface of the measurement object; and a second arithmetic unit that obtains the thickness of the measurement object based on a value of the parameter included in the theoretical equation corresponding to the theoretical curve.

A defect detection method according to the present disclosure is a defect detection method for measuring a depth of a defect inside an inspection object, comprising the steps of: heating a surface of the inspection object by a heating device; generating thermal image data corresponding to a temperature of the surface of the inspection object by photographing the heated surface of the inspection object at a predetermined time interval by a photographing device; obtaining a temperature curve showing a temporal change in temperature of the surface of the inspection object based on the thermal image data; fitting a theoretical equation obtained from a heat conduction equation including a parameter related to the depth of the defect of the inspection object to the temperature curve to obtain a theoretical curve showing a temporal change in temperature of the surface of the inspection object; and obtaining the depth of the defect of the inspection object based on a value of the parameter included in the theoretical equation corresponding to the theoretical curve.

A defect detection device according to the present disclosure is a defect detection device for measuring a depth of a defect inside an inspection object, comprising: an input unit that inputs thermal image data generated by photographing a heated surface of the inspection object at a predetermined time interval; a first arithmetic unit that obtains a temperature curve showing a temporal change in temperature of the surface of the inspection object based on the thermal image data; a fitting unit that fits a theoretical equation obtained from a heat conduction equation including a parameter related to the depth of the defect of the inspection object to the temperature curve to obtain a theoretical curve showing a temporal change in temperature of the surface of the inspection object; and a second arithmetic unit that obtains the depth of the defect of the inspection object based on a value of the parameter included in the theoretical equation corresponding to the theoretical curve.

With the thickness measurement method and device according to the present disclosure, the thickness of the measurement object can be measured in a short time. The defect detection method and device according to the present disclosure are used for measuring a defect such as a separation or a cavity inside an inspection object so that the defect can be measured in a short time.

DESCRIPTION OF EMBODIMENT

Hereinafter, embodiments will be described with reference to the attached drawings as appropriate. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor(s) for sufficient understanding of this disclosure by those skilled in the art, and it is not intended to limit the subject matter described in claims thereto.

First Embodiment

A defect detection system of a first embodiment will hereinafter be described with reference to FIGS. 1 to 9.
[1-1. Configuration]
[1-1-1. Defect Detection System]

Figure 1:
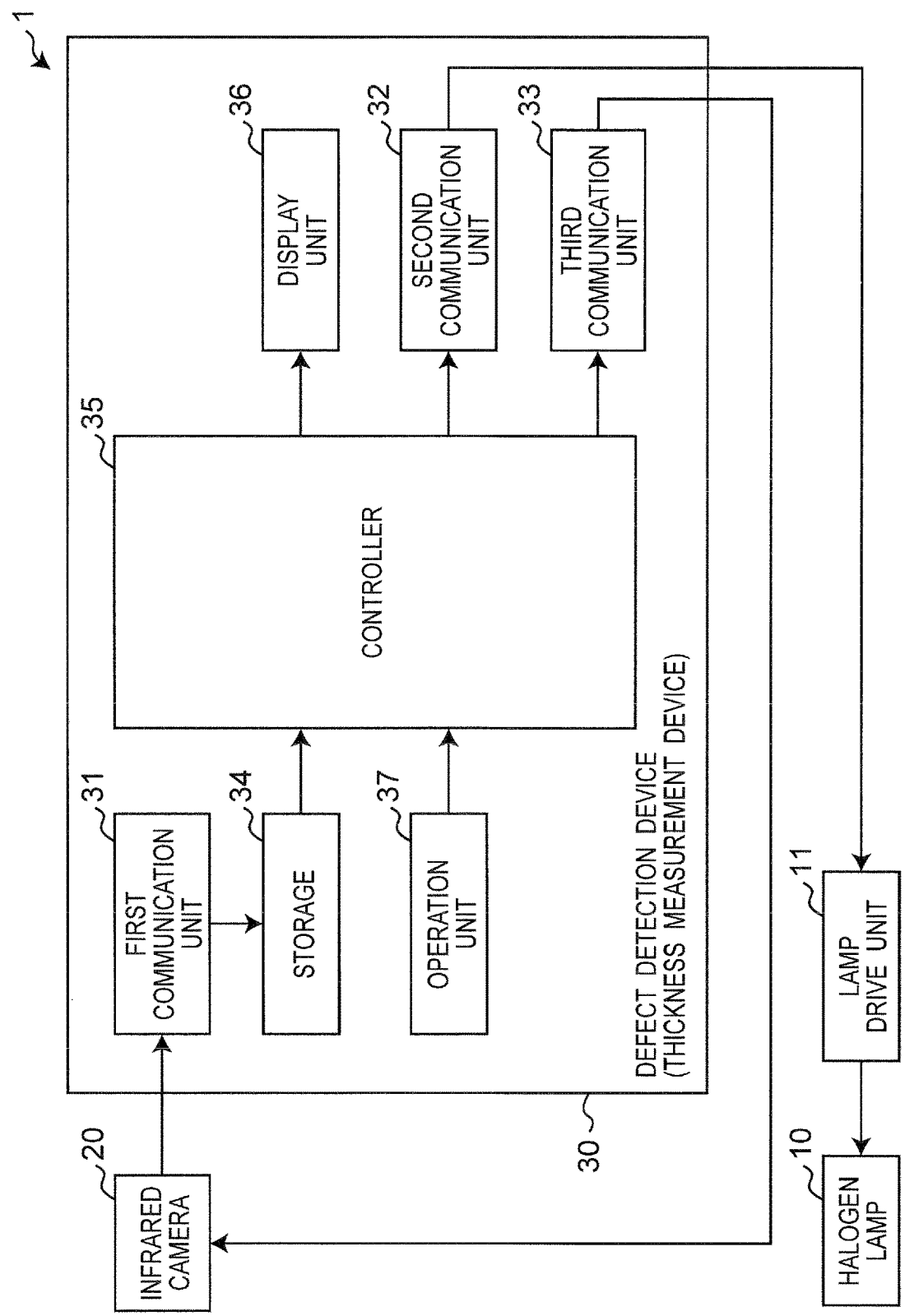
FIG. 1 is a diagram of a configuration of a defect detection system and a defect detection device according to a first embodiment.

FIG. 1 is a diagram of a configuration of a defect detection system 1 according to the first embodiment. As shown in FIG. 1, the defect detection system 1 measures a depth of a defect such as a separation or a cavity inside an inspection object, thereby performing defect detection. The defect detection system 1 includes a halogen lamp 10, a lamp drive unit 11, an infrared camera 20, and a defect detection device 30.

The halogen lamp 10 is a heating device heating a surface of an inspection object. The halogen lamp 10 includes a shutter for starting and stopping a heating output.

The lamp drive unit 11 is a device driving the halogen lamp 10. The lamp drive unit 11 controls the start and stop of the heating output of the halogen lamp 10 under the control of a controller 35 of the defect detection device 30. Therefore, the lamp drive unit 11 controls opening and closing of the shutter of the halogen lamp 10. The lamp drive unit 11 may control the start and stop of the heating output of the halogen lamp 10 through starting and stopping a power supply to the halogen lamp 10.

The infrared camera 20 is a photographing device photographing a surface of an inspection object. The infrared camera 20 has multiple pixels and generates thermal image data corresponding to the temperature of the surface of the inspection object at a predetermined frame rate.

The defect detection device 30 controls the lamp drive unit 11 to control the start and stop of the heating output of the halogen lamp 10. The defect detection device 30 controls a photographing operation of the infrared camera 20. The defect detection device 30 measures a depth of a defect inside the inspection object based on the thermal image data from the infrared camera 20, thereby performing defect detection. A configuration of the defect detection device 30 will hereinafter be described.

[1-1-2. Defect Detection Device]

The defect detection device 30 is made up of a computer, for example. As shown in FIG. 1, the defect detection device 30 includes first to third communication units 31, 32, 33, a storage 34, a controller 35, a display unit 36, and an operation unit 37.

The first to third communication units 31, 32, 33 are each made up of a communication interface (e.g., USB, HDMI (registered trademark)), for example. The first communication unit 31 is an input unit sequentially receiving from the infrared camera 20 the thermal image data photographed at a predetermined frame rate.

The second communication unit 32 receives lamp control information related to a start heating, a heating stop, etc. of the halogen lamp 10 from the controller 35 and transmits the information to the lamp drive unit 11. The third communication unit 33 receives camera control information related to a photographing start, a photographing end, etc. of the infrared camera 20 from the controller 35 and transmits the information to the infrared camera 20.

The storage 34 is a recording medium and is made up of an HDD or an SSD, for example. The storage 34 sequentially stores the thermal image data received by the first communication unit 31. The storage 34 stores various setting values input from the operation unit 37 described later and necessary for measuring the depth of the defect of the inspection object. The storage 34 also stores various programs for the controller 35.

The controller 35 is made up of a CPU, an MPU, etc. and executes various programs stored in the storage 34 to control the entire defect detection device 30. The controller 35 controls the lamp drive unit 11 to control the start and stop of the heating output of the halogen lamp 10. The controller 35 controls the photographing operation of the infrared camera 20 such as start and stop of photographing. The controller 35 obtains the depth of the defect of the inspection object based on the thermal image data stored in the storage 34. In this case, controller 35 functions as a first arithmetic unit, a fitting unit, and a second arithmetic unit. Details of these functions will be described in description of operation described later.

The display unit 36 is made up of a display, for example, and displays the depth of the defect obtained by the controller 35 as color information or gradation information, for example.

The operation unit 37 is made up of a keyboard or a touch panel, for example. The operation unit 37 is a device operated by a user when setting various setting values necessary for measuring the depth of the defect of the inspection object.

[1-2. Operation]

The operation of the defect detection system 1 and the defect detection device 30 configured as described above will hereinafter be described.

[1-2-1. Overview of Defect Detection]

First, an overview of defect detection of the present disclosure will be described with reference to FIGS. 2 to 5.

(1) Overview of Conventional Defect Detection

Figure 2:
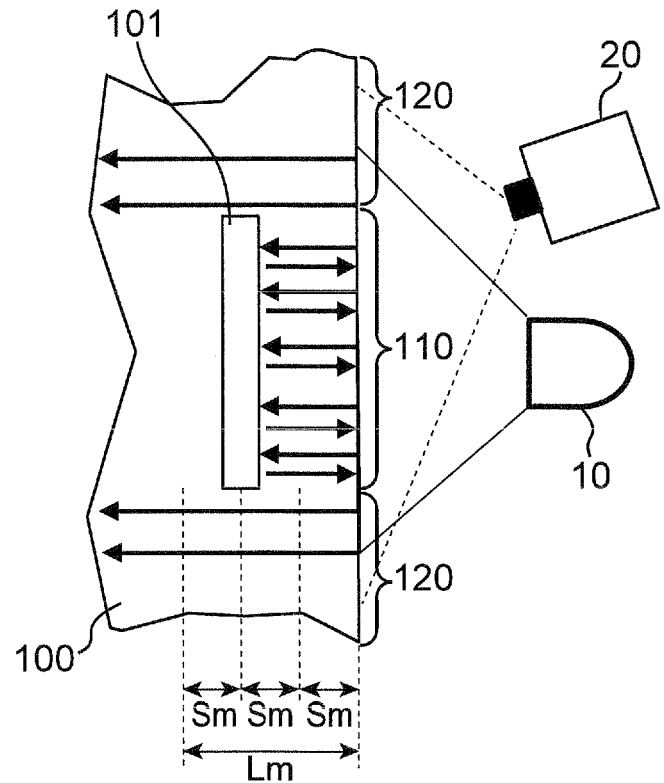
FIG. 2 is a diagram for explaining an overview of defect detection.

Referring to FIG. 2, when a surface of an inspection object 100 is heated by a heating device such as a halogen lamp etc., heat conduction occurs from the surface (high temperature side) toward the inside (low temperature side) of the inspection object 100. In this case, if a defect 101 such as a separation or a cavity exists inside the inspection object 100, the heat conduction is prevented by the defect 101 so that thermal reflection occurs. As a result, a surface temperature becomes higher in a defective portion 110 having the defect 101 existing therein as compared to a surface temperature of a sound portion 120 having no defect existing therein. This temperature difference on the surface is utilized for detecting a defect in a known method.

Figure 16:
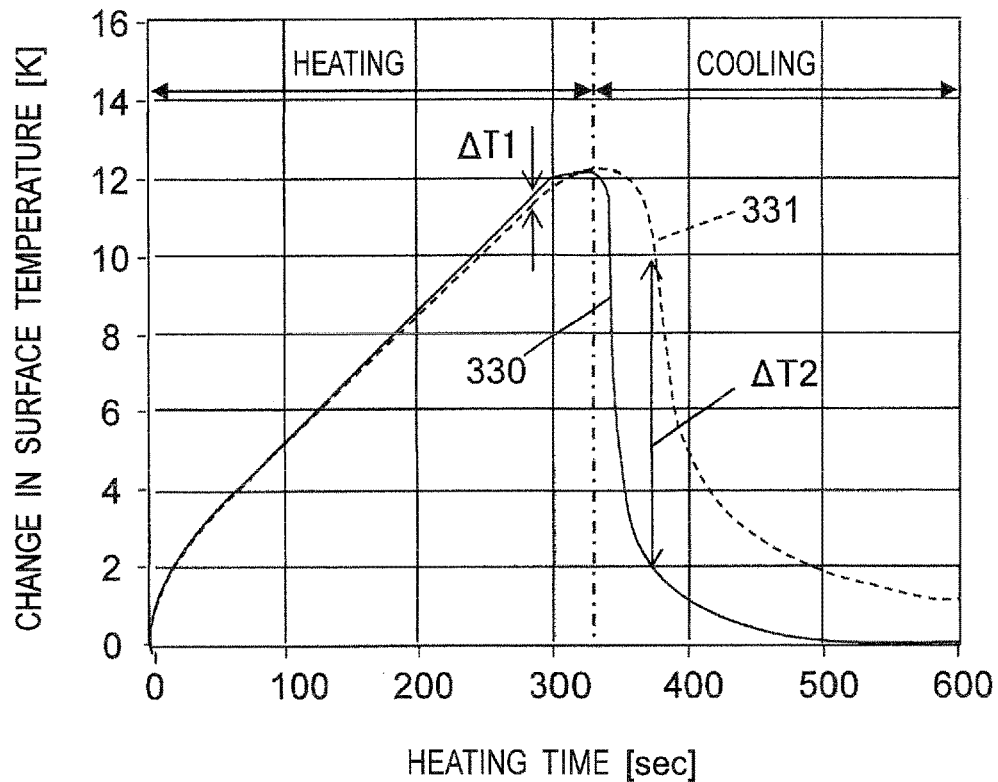
FIG. 16 is a diagram of a time change in surface temperature of a defective portion and a time change in surface temperature of a sound portion during natural cooling after heating.

In a conventional defect detection method, during natural cooling after the surface of the inspection object 100 is sufficiently heated by the heating device (e.g., in the case of concrete of a highway etc., for several tens of minutes to one hour), the surface temperature of the inspection object 100 is photographed by a photographing device such as an infrared camera to generate a thermal image corresponding to the surface temperature of the inspection object 100. In this defect detection method, a defect is detected from a temperature difference indicated by a thermal image. FIG. 16 shows a time change of the surface temperature of the defective portion and a time change of the surface temperature of the sound portion during natural cooling after heating. A curve 330 is the time change of the surface temperature of the sound portion, and a curve 331 is the time change of the surface temperature of the defective portion. As shown in FIG. 16, a temperature difference ΔT2 occurring during natural cooling between the surface temperature of the defective portion and the surface temperature of the sound portion becomes larger than a temperature difference ΔT1 occurring during heating between the surface temperature of the defective portion and the surface temperature of the sound portion. In the conventional defect detection method, this phenomenon is utilized to perform defect detection by using a thermal image at the time of natural cooling after heating. This conventional defect detection method requires sufficient heating of the surface of the inspection object 100 so that a temperature difference appears in the thermal image, requiring time for detection.

(2) Overview of Defect Detection of the Present Disclosure

In a defect detection method of the present disclosure, while the surface of the inspection object 100 is being heated by the heating device 10, the surface temperature of the inspection object 100 is photographed by the photographing device 20 such as an infrared camera to generate thermal image data corresponding to the surface temperature of the inspection object 100. In the defect detection method of the present disclosure, the defect detection is performed by using this thermal image data and a theoretical equation (Eq. (1) described later) obtained from a heat conduction equation.

Figure 3:
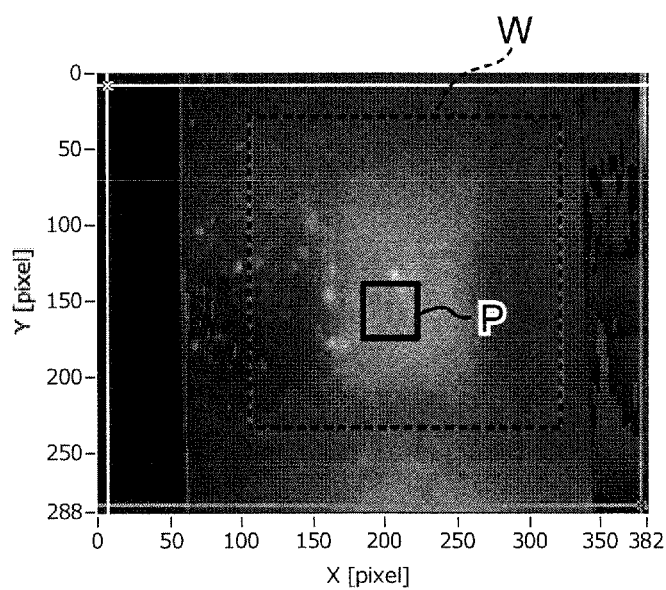
FIG. 3 is a diagram of an example of a thermal image corresponding to a temperature of a surface of an inspection object photographed by an infrared camera.
Figure 4:
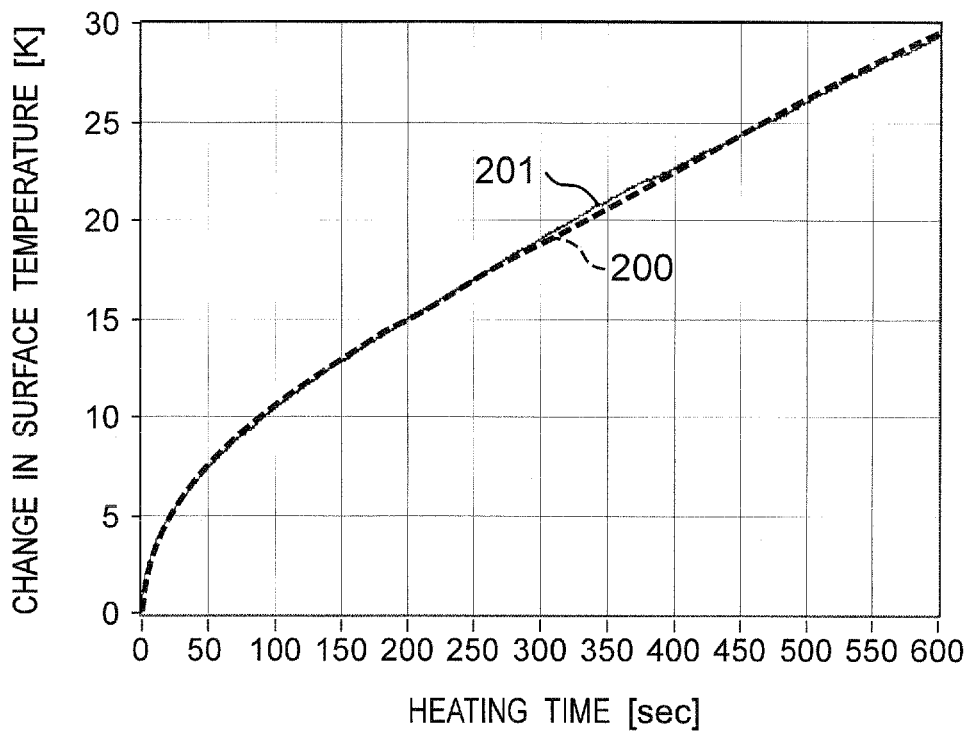
FIG. 4 is a diagram of an example of a temperature curve showing a temporal change in temperature in a partial region of the thermal image shown in FIG. 3.

FIG. 3 is a diagram of an example of a thermal image corresponding to a temperature of a surface of an inspection object photographed by an infrared camera. FIG. 4 is a diagram of an example of a temperature curve showing a temporal change in temperature in a partial region P of the thermal image shown in FIG. 3.

In FIG. 4, a broken line 200 is a temperature curve of temperature change of the inspection object surface obtained from actually measured thermal image data, and a solid line 201 is a theoretical curve of temperature change of the inspection object surface obtained by curve fitting of the theoretical equation of Eq. (1) described later to the temperature curve of temperature change of the broken line 200. In a defect depth measurement method of the present disclosure, as shown in FIG. 4, the theoretical curve 201 is obtained by the curve fitting of the theoretical equation of Eq. (1) described later obtained from the heat conduction equation to the temperature curve 200 obtained from actually measured thermal image data. In the defect depth measurement method of the present disclosure, a depth L of a defect of an inspection object is obtained, by using Eq. (2) or Eq. (3) described later, based on a value of a parameter a or b in the theoretical equation corresponding to the theoretical curve 201.

Figure 5:
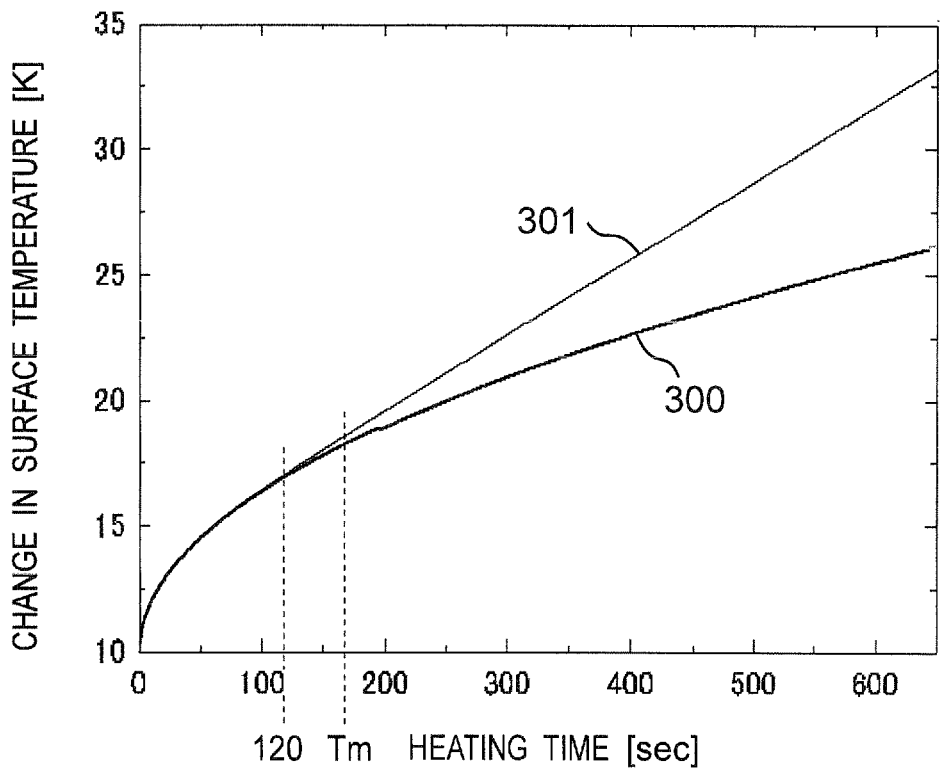
FIG. 5 is a diagram of an example of a temperature curve of a sound portion and an example of a temperature curve of a defective portion in an inspection object.

FIG. 5 is a diagram of an example of a temperature curve of a sound portion and an example of a temperature curve of a defective portion in an inspection object compared with each other. In FIG. 5, a curve 300 is a temperature curve showing a temperature change of the sound portion, and a curve 301 is a temperature curve showing a temperature change of the defective portion. The temperature curves 300, 301 of FIG. 5 are results calculated by using the theoretical equation of Eq. (1) described later. In FIG. 5, values of mortar (concrete) are used as the material constants (for a thermal diffusivity $\alpha$, the thermal diffusivity of common concrete, $1.21 \times 10^{-6}$ m$^2$/s is used), and a defect depth of the defective portion is set to L=19.6 mm, while the sound portion is set to an L value that is sufficiently large with respect to the defect depth of the defective portion.

In FIG. 5, a difference appears between the surface temperature of the sound portion and the surface temperature of the defective portion from a heating time of about 120 seconds. In the defect detection method of the present disclosure, fitting measurement can be performed from thermal image data corresponding to such a time (i.e., heating time) required for a difference to appear between the surface temperature of the sound portion and the surface temperature of the defective portion. Therefore, the defect detection method of the present disclosure can shorten the time of heating of the surface of the inspection object and the measurement time from the heating to the measurement of the defect depth as compared to the conventional method (by several minutes to several tens of minutes in the example of FIG. 5).

The time of heating causing a surface temperature difference to start appearing is related to the defect depth and becomes longer when the defect depth is deeper.

(3) Derivation of the Theoretical Equation of Temperature Change Obtained from the Heat Conduction Equation Derivation of the theoretical equation of temperature change obtained from the heat conduction equation will hereinafter be described. A one-dimensional unsteady heat conduction equation is represented by the following equation.

[Math 1]

$$\frac{\partial T}{\partial t} = \alpha \frac{\partial^2 T}{\partial x^2} \tag{0}$$

From this heat conduction equation, the following equation is derived as a theoretical equation in a step response (see Eq. (3) on page 112 of "Horatio Scott Carslaw and John Conrad Jaeger, 'CONDUCTION OF HEAT IN SOLIDS', Second Edition, Oxford University Press, 1959, p. 112".).

[Math 2]

$$T(x,t) = \frac{F_0 t}{\rho c L} + \frac{F_0}{k}\left(\frac{3x^2 - L^2}{6L} + \frac{2L}{\pi^2}\sum_{n=1}^{\infty}\frac{(-1)^{n+1}}{n^2}\cos\frac{n\pi}{L}x e^{-\frac{\alpha n^2 \pi^2}{L^2}t}\right)$$

In the equation, T(x,t) is a surface temperature [K] of the inspection object; x is a position [m] in the depth direction based on the surface of the inspection object (0<x<L); t is a time [s]; $F_0$ is a heat flux [W/m$^2$]; $\rho$ is a density [kg/m$^3$] of the inspection object; c is a specific heat [J/(kg·K)] of the inspection object; $\rho c$ is a volumetric specific heat [J/(m$^3$·K)] of the inspection object; k is a heat conductivity [W/(m·K)] of the inspection object; and $\alpha = k/\rho c$ is a thermal diffusivity [m$^2$/s] of the inspection object.

In the equation, when a defect exists at a position of the depth L from the surface of the inspection object, x=L is satisfied, and the following equation is derived.

[Math 3]

$$T(L,t) = \frac{F_0 t}{\rho c L} + \frac{F_0}{k}\left(\frac{L}{3} + \frac{2L}{\pi^2}\sum_{n=1}^{\infty}\frac{-1}{n^2}e^{-\frac{\alpha n^2 \pi^2}{L^2}t}\right)$$

In the equation, T(L,t) is the temperature [K] of the surface of the inspection object, and L is the depth [m] of the defect from the surface of the inspection object.

The inventor of the present application attempted curve fitting of the above theoretical equation to a temperature curve obtained from actually measured thermal image data. However, the above theoretical equations have four fitting parameters $F_0$, $\rho c$, k, L, and multiple combinations exist as solutions of $F_0$, $\rho c$, k, L. The inventor of the present application found that this problem can be addressed by converting the four parameters $F_0$, $\rho c$, k, L into two parameters a, b as shown in Eqs. (2) and (3) to reduce the fitting parameters.

As a result, the inventor of the present application derived Eqs (1) to (3) as theoretical equations of the heat conduction equation.

[Math 4]

$$T(L,t) = a\left(bt + \frac{1}{3} + \frac{2}{\pi^2}\sum_{n=1}^{\infty}\frac{-1}{n^2}e^{-bn^2\pi^2 t}\right) \tag{1}$$

-continued

[Math 5]

$$a = \frac{F_0 L}{k} \quad (2)$$

$$b = \frac{\alpha}{L^2} \quad (3)$$

In the defect detection method of the present disclosure, Eqs (1) to (3) are used for the fitting to the actually measured temperature curve.

[1-2-2. Defect Detection Operation]

A defect detection operation by the controller 35 of the defect detection device 30 according to the first embodiment will hereinafter be described with reference to a flowchart of FIG. 6.

Figure 6:
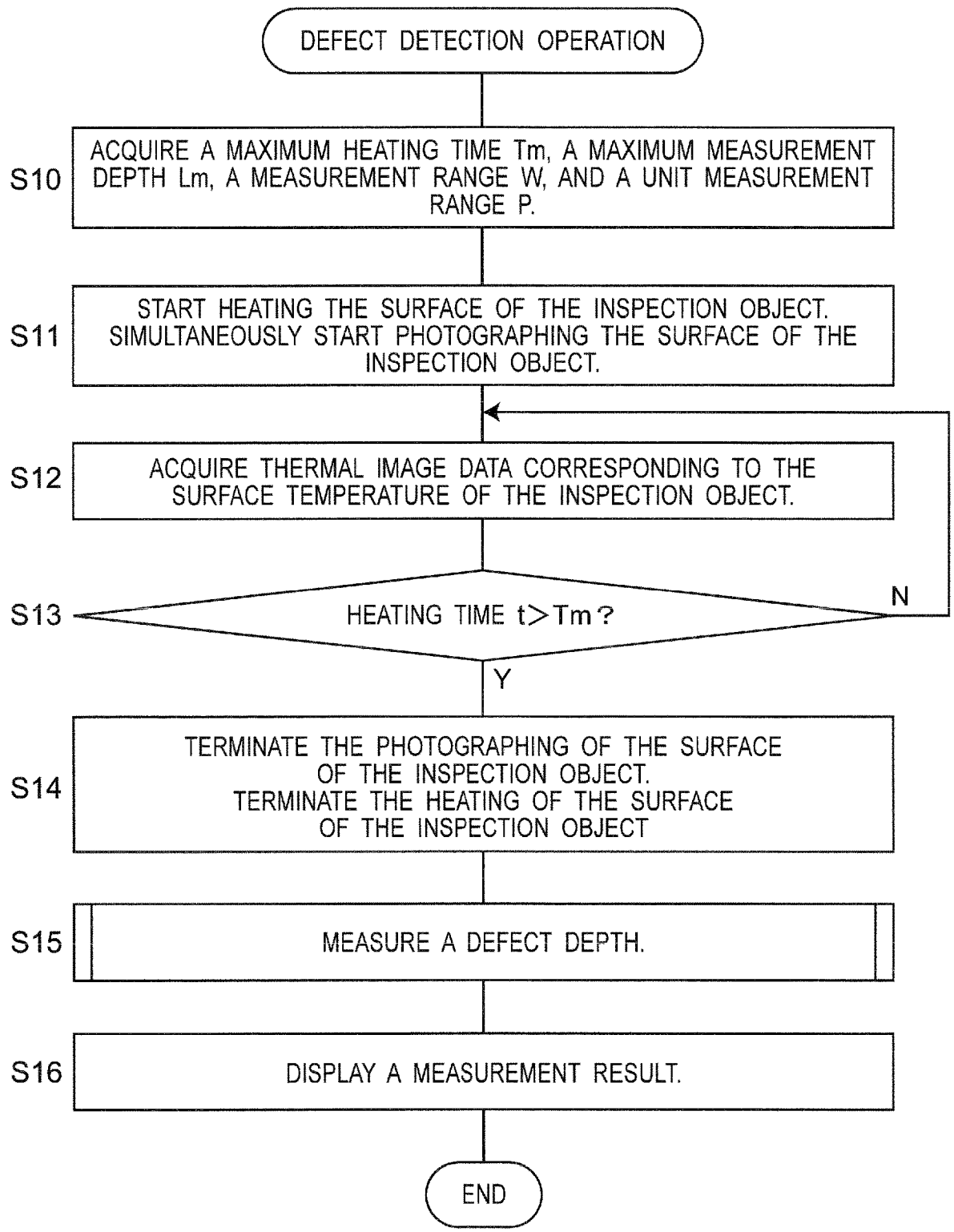
FIG. 6 is a diagram of a defect detection operation by a controller of the defect detection device according to the first embodiment.

As shown in FIG. 6, first, the controller 35 acquires a maximum heating time Tm, a maximum measurement depth Lm, a measurement range W, and a unit measurement range P as setting values (S10). These setting values are input by a user using the operation unit 37 and preliminarily stored in the storage 34.

The maximum measurement depth Lm is a maximum value of a depth to be measured in this defect detection and is set depending on a desired depth to which a defect is detected. For example, when a defect in a highway etc. is detected, the outermost steel frame is present at 50 cm from the surface, and therefore, it is required to detect whether a defect such as a separation or a void exists up to the depth of about 50 cm from the surface. In such a case, the maximum measurement depth Lm is set to 50 cm.

The maximum heating time Tm is set in relation to the maximum measurement depth Lm. For example, as shown in FIG. 5, the maximum heating time Tm is set to a heating time such that a difference sufficiently appears between the surface temperature of the defective portion and the surface temperature of the sound portion at the maximum measurement depth Lm.

As shown in FIG. 3, the measurement range W is a range of measurement performed in the photographing range of the infrared camera 20. As shown in FIG. 3, the unit measurement range P is a range of measurement performed at one time in the measurement range W. The unit measurement range P is set on the basis of a pixel unit of the infrared camera 20 and may be a single pixel unit or multiple pixel units. When the unit measurement range P is multiple pixel units, the thermal image data corresponding to these pixels may be averaged.

Figure 7:
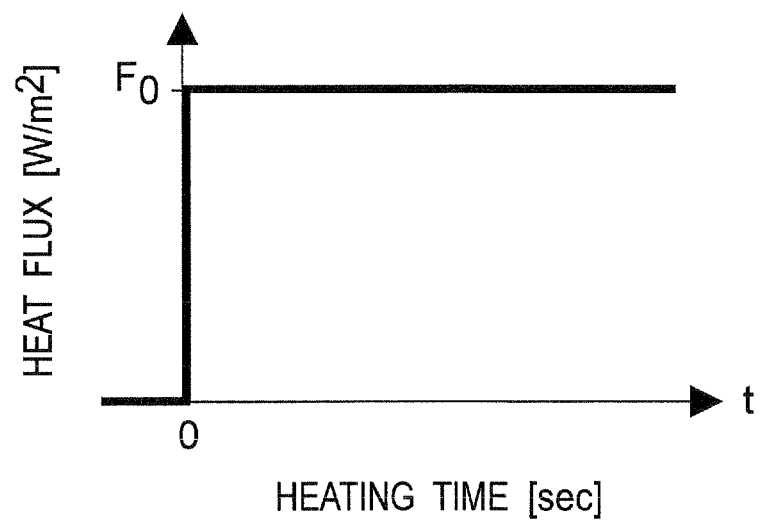
FIG. 7 is a diagram of output of a halogen lamp.

The controller 35 then controls the lamp drive unit 11 to open the shutter of the halogen lamp 10 to start heating the surface of the inspection object in a step-like manner such that a heat flux Fo becomes constant as shown in FIG. 7 (S11). Specifically, the heating is performed such that a heating input is achieved as a step input. Simultaneously with the start of heating of the inspection object, the controller 35 controls the infrared camera 20 to start photographing the surface of the inspection object (S11).

Eq. (1) is the theoretical equation of the heat conduction equation at the time of a step response. Therefore, to actually measure a temperature curve for fitting to this theoretical equation, the heating is started in a step-like manner. However, it generally takes a comparatively long time for the halogen lamp to stabilize the output after the start of power supply, so that it is difficult to achieve step-like heating through the power supply control. Therefore, in this embodiment, the controller 35 preliminarily supplies electric power to the halogen lamp 10 and controls the opening and closing of the shutter of the halogen lamp 10 to start heating of the surface of the inspection object in a step-like manner.

The controller 35 then acquires thermal image data corresponding to the surface temperature of the inspection object from the infrared camera 20 (S12). The acquired thermal image data is stored in the storage 34.

The controller 35 then determines whether a heating time t from the start of heating exceeds the maximum heating time Tm (S13) and continues the acquisition of thermal image data (S12) until the heating time t exceeds the maximum heating time Tm.

On the other hand, if the heating time t exceeds the maximum heating time Tm at step S13, the controller 35 controls the infrared camera 20 to terminate the photographing of the surface of the inspection object (S14). The controller 35 also controls the lamp drive unit 11 to close the shutter of the halogen lamp 10 and terminate the heating of the surface of the inspection object (S14). As a result, the thermal image data acquired during the maximum heating time Tm is accumulated in the storage 34.

The controller 35 then measures a defect depth (S15). This process will be described later.

Figure 8:
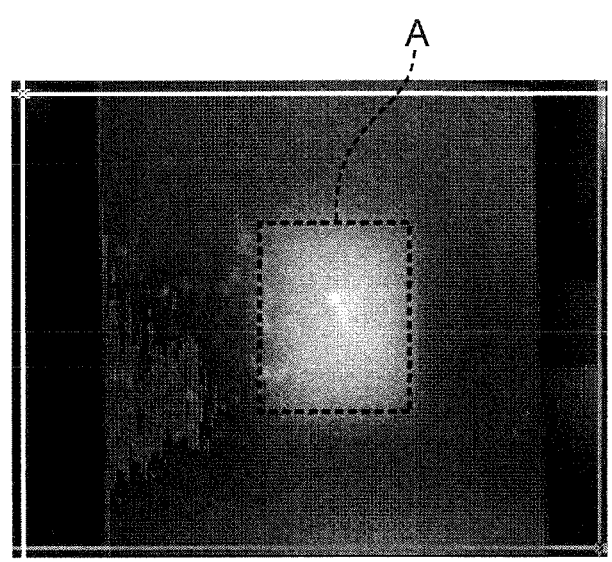
FIG. 8 is a diagram of an example of display of a measurement result of a defect depth by a display unit.

The controller 35 then displays a measurement result of the defect depth on the display unit 36 (S16) and terminates the defect detection operation. FIG. 8 is a diagram of an example of display of the measurement result of the defect depth. FIG. 8 shows the presence of a defect of a defect depth L in a region A. The controller 35 may display the defect depth L information as color information as shown in FIG. 8 or as gradation information.

The defect depth measurement operation of FIG. 6 will hereinafter be described with reference to a flowchart of FIG. 9.

First, the controller 35 obtains the temperature curve 200 showing a temporal change in surface temperature of the inspection object as shown in FIG. 4, based on the thermal image data acquired during the maximum heating time Tm for each unit measurement range P (S150).

The controller 35 then performs fitting of the theoretical equation of Eq. (1) obtained from the heat conduction equation to the obtained temperature curve 200 to obtain a theoretical curve 201 showing a temporal change in temperature of the surface of the inspection object (S151). In this case, the controller 35 changes the parameters a, b in the theoretical equation of Eq. (1) and uses the nonlinear least-squares method to perform the fitting such that the residual is minimized.

The controller 35 obtains the defect depth L of the inspection object by using Eq. (3) from the value of the parameter b in the theoretical equation of Eq. (1) corresponding to the theoretical curve 201 (S152). For the thermal diffusivity $\alpha$ in Eq. (3), for example, a material constant based on material information of the inspection object may be used. The controller 35 may obtain the defect depth L of the inspection object by using Eq. (2) from the value of the parameter a as well as the heat flux $F_0$ and the heat conductivity k based on the material information of the inspection object.

The controller 35 then determines whether the measurement of the defect depth is completed for all the unit measurement ranges P in the measurement range W (S153). If the unit measurement range P not yet measured exists, the controller 35 repeats the above process until the process of steps S150 to S153 described above is executed for all the unit measurement ranges P. On the other hand, if the measurement of the defect depth is completed for all the unit measurement ranges P at step S153, the controller 35 terminates the defect depth measurement operation.

[1-3. Effects]

As described above, in this embodiment, the defect detection method is a defect detection method of measuring a depth of a defect inside an inspection object. This defect detection method includes: a step of heating a surface of the inspection object by the halogen lamp (heating device) 10; a step of generating thermal image data corresponding to a temperature of the surface of the inspection object by photographing the heated surface of the inspection object at a maximum heating time interval (predetermined time interval) Tm by the infrared camera (photographing device) 20; a step of obtaining the temperature curve 200 showing a temporal change in temperature of the surface of the inspection object based on the thermal image data; a step of fitting a theoretical equation (Eq. (1)) obtained from the heat conduction equation including the parameters a, b related to the depth L of the defect of the inspection object to the temperature curve 200 to obtain the theoretical curve 201 showing a temporal change in temperature of the surface of the inspection object; and a step of obtaining the depth of the defect of the inspection object based on a value of the parameter b included in the heat conduction equation corresponding to the theoretical curve 201.

In this embodiment, the defect detection device is a defect detection device 30 measuring a depth of a defect inside an inspection object and includes the first communication unit (input unit) 31, and the controller (a first arithmetic unit, a fitting unit, and a second arithmetic unit) 35. The first communication unit 31 inputs thermal image data generated by photographing a heated surface of the inspection object at the maximum heating time interval (predetermined time interval) Tm. The controller 35 obtains the temperature curve 200 showing a temporal change in temperature of the surface of the inspection object based on the thermal image data. The controller 35 performs fitting of the theoretical equation (Eq. (1)) obtained from the heat conduction equation including the parameters a, b related to the depth of the defect of the inspection object to the temperature curve 200 to obtain the theoretical curve 201 showing a temporal change in temperature of the surface of the inspection object. The controller 35 obtains the depth L of the defect of the inspection object based on a value of the parameter b included in the heat conduction equation corresponding to the theoretical curve 201.

In this embodiment, the defect detection system is a defect detection system 1 measuring a depth of a defect inside an inspection object, and includes the halogen lamp (heating device) 10, the infrared camera (photographing device) 20, and the defect detection device 30 described above. The halogen lamp 10 heats the surface of the inspection object. The infrared camera 20 photographs the heated surface of the inspection object and generates thermal image data corresponding to the temperature of the surface of the inspection object. The defect detection device 30 measures the depth of the defect inside the inspection object based on the thermal image data.

As a result, the defect depth can be obtained by using the thermal image data during heating in accordance with the theoretical equation at the time of a step response of Eq. (1) obtained from the heat conduction equation. Since the fitting of the theoretical equation of Eq. (1) is performed to the temperature curve obtained from the actually measured thermal image data, the defect depth can be obtained from the thermal image data having a relatively small temperature difference, i.e., the thermal image data acquired in a relatively short heating time from the start of heating. This can result in shortening of the time of heating of the surface of the inspection object and the measurement time from the heating to measurement of the defect depth.

Second Embodiment

In the first embodiment, the defect depth is measured only once at the maximum measurement depth Lm by using the entire thermal image data acquired during the maximum heating time Tm. In this embodiment, the defect depth is measured while the depth of measurement is changed in stages, by using partial thermal image data acquired in stages during the maximum heating time Tm.

A defect detection operation by the controller 35 of the defect inspection device 30 according to the second embodiment will hereinafter be described with reference to flowcharts of FIGS. 10 and 11.

Figure 10:
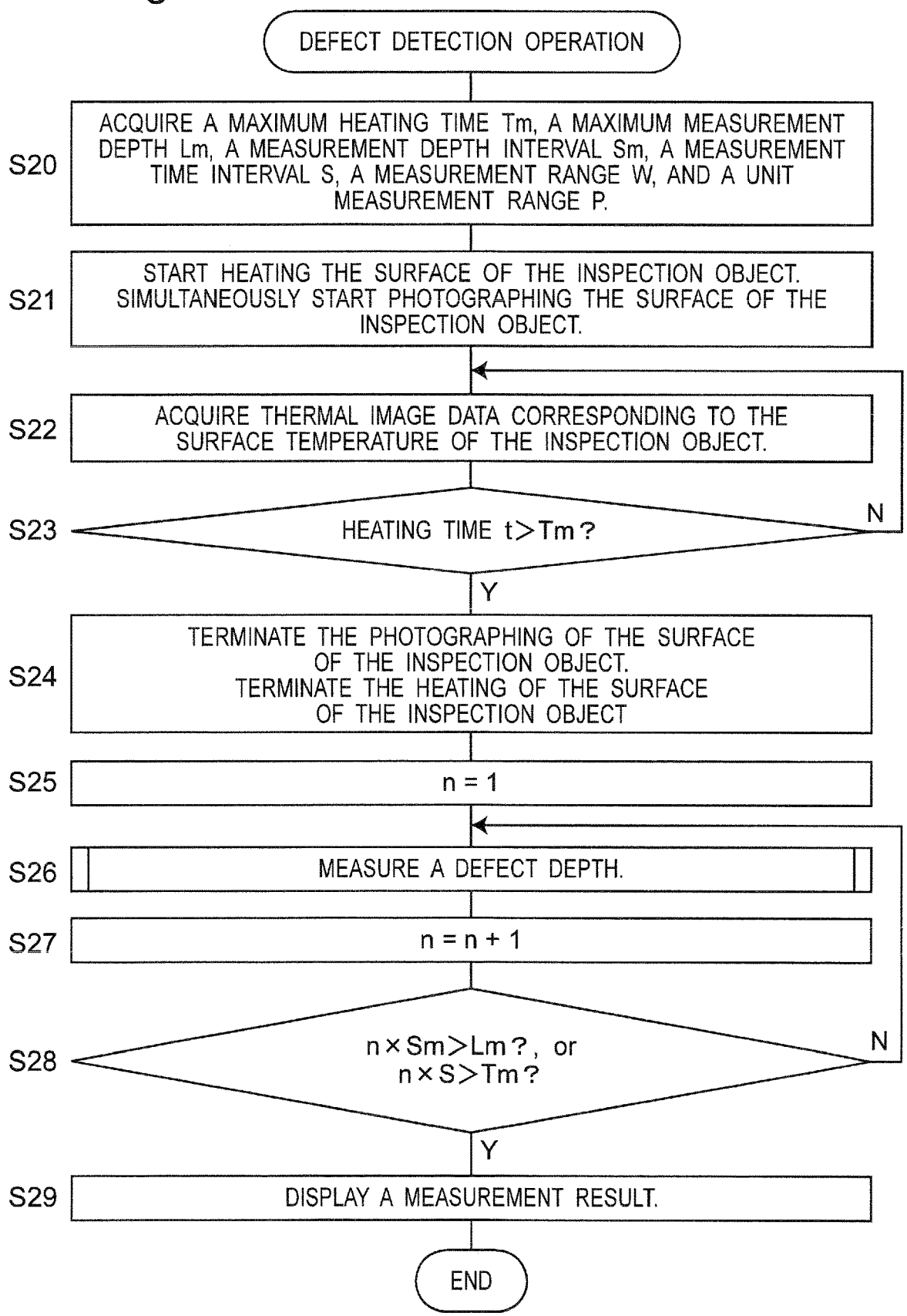
FIG. 10 is a diagram of a defect detection operation by the controller of the defect detection device according to a second embodiment.
Figure 11:
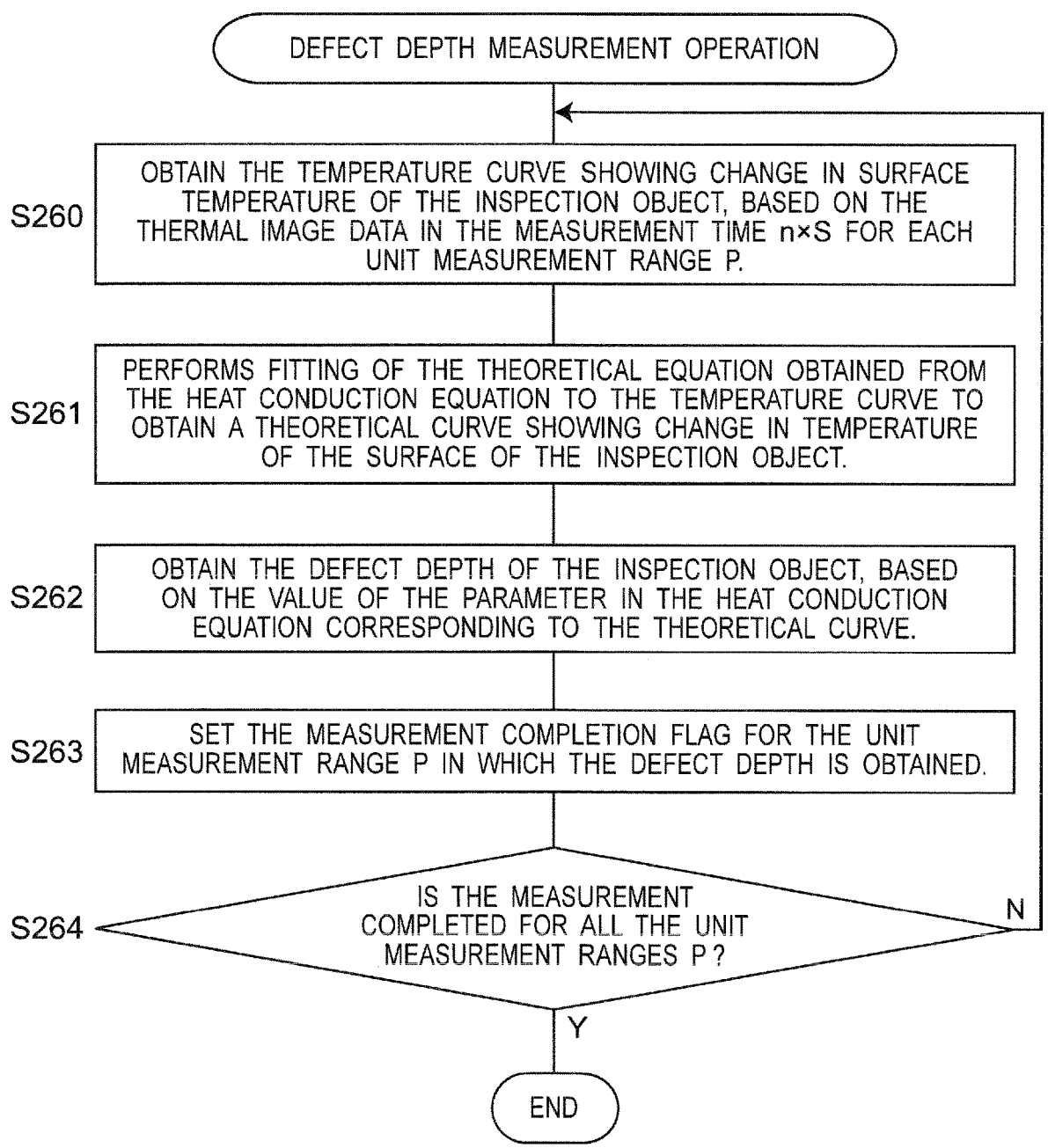
FIG. 11 is a diagram of a defect depth measurement operation by the controller of the defect detection device according to the second embodiment

As shown in FIG. 10, first, the controller 35 acquires a measurement depth interval Sm and a measurement time interval S as setting values in addition to the maximum heating time Tm, the maximum measurement depth Lm, the measurement range W, and the unit measurement range P described above (S20).

The measurement depth interval Sm is a depth interval for performing measurement in stages for the maximum measurement depth Lm. For example, when the measurement is performed in 10 stages for the maximum measurement depth Lm=50 cm, the measurement depth interval Sm is set to 5 cm.

The measurement time interval S is set in conjunction with the measurement depth interval Sm and the maximum heating time Tm. For example, when the measurement is performed inn stages for the maximum measurement depth Lm, the measurement depth interval Sm is set to Sm=Lm/n, and the measurement time interval S is set to S=Tm/n.

Operations of steps S21, S22, S23, S24 are then performed. The operations of steps S21, S22, S23, S24 are the same as the operations of steps S11, S12, S13, S14, respectively, described above. As a result, the controller 35 acquires the thermal image data at the maximum heating time Tm before measuring the defect depth.

For measuring the defect depth in stages at a measurement depth n×Sm having n stages for the maximum measurement depth Lm, the controller 35 first sets n to an initial value of 1 (S25).

The controller 35 then measure a depth of a defect existing up to the measurement depth n×Sm out of the maximum measurement depth Lm by using thermal image data measured in the measurement time n×S out of the thermal image data acquired during the maximum heating time Tm (S26). Details of the defect depth measurement process will be described later.

The controller 35 then increases n by 1 to change the depth of the measurement object (S27).

The controller 35 then determines whether the measurement depth n×Sm exceeds the maximum measurement depth Lm or whether the measurement time n×S exceeds the maximum heating time Tm (S28). If n×Sm does not exceed Lm and n×S does not exceed Tm, the operation returns to step S26, and the controller 35 measure the depth of the defect existing up to the measurement depth increased by the measurement depth interval Sm by using the thermal image data corresponding to the measurement time increased by the measurement time interval S.

On the other hand, if n×Sm exceeds Lm or n×S exceeds Tm at step S28, the controller 35 displays the measurement result of the defect depth in the measurement range W on the display unit 36 (S29) and terminates the defect detection operation.

The defect depth measurement operation at step S26 of FIG. 10 will hereinafter be described with reference to a flowchart of FIG. 10.

First, the controller 35 obtains the temperature curve 200 showing a temporal change in the surface temperature of the inspection object as shown in FIG. 4, by using the thermal image data measured in the measurement time n×S out of the thermal image data acquired during the maximum heating time Tm for each unit measurement range P (S260).

In this case, the controller 35 does not measure a defect depth in the unit measurement range P corresponding to thermal pixel data having a measurement completion flag set at step S263 described later. The measurement completion flag is a flag indicative of the completion of measurement of the defect depth. As a result, at step S262 described later, the controller 35 can avoid redundant measurement for the unit measurement range P in which the measurement of the defect depth is already completed at or before the previous stage of the measurement depth n×S.

Operations of steps S261, S262 are then performed. The operations of steps S261, S262 are the same as the operations of steps S151, S152, respectively, described above. As a result, the depth of the defect existing up to the measurement depth n×S can be measured.

The controller 35 sets the measurement completion flag for the thermal image data in the unit measurement range P in which the defect depth L is obtained (S263).

The above process is executed for all the unit measurement ranges P (S264).

As described above, also in this embodiment, since the fitting of the theoretical equation of Eq. (1) is performed to the temperature curve obtained from the thermal image data actually measured during heating, the defect depth can be obtained from the thermal image data acquired in a relatively short heating time from the start of heating. This can result in shortening of the time of heating of the surface of the inspection object and the measurement time from the heating to measurement of the defect depth.

Third Embodiment

In the second embodiment, the defect depth measurement is performed in stages after the entire thermal image data is acquired for the maximum heating time Tm. In contrast, in this embodiment, the defect depth measurement is performed in stages during acquisition of the thermal image data.

Figure 12:
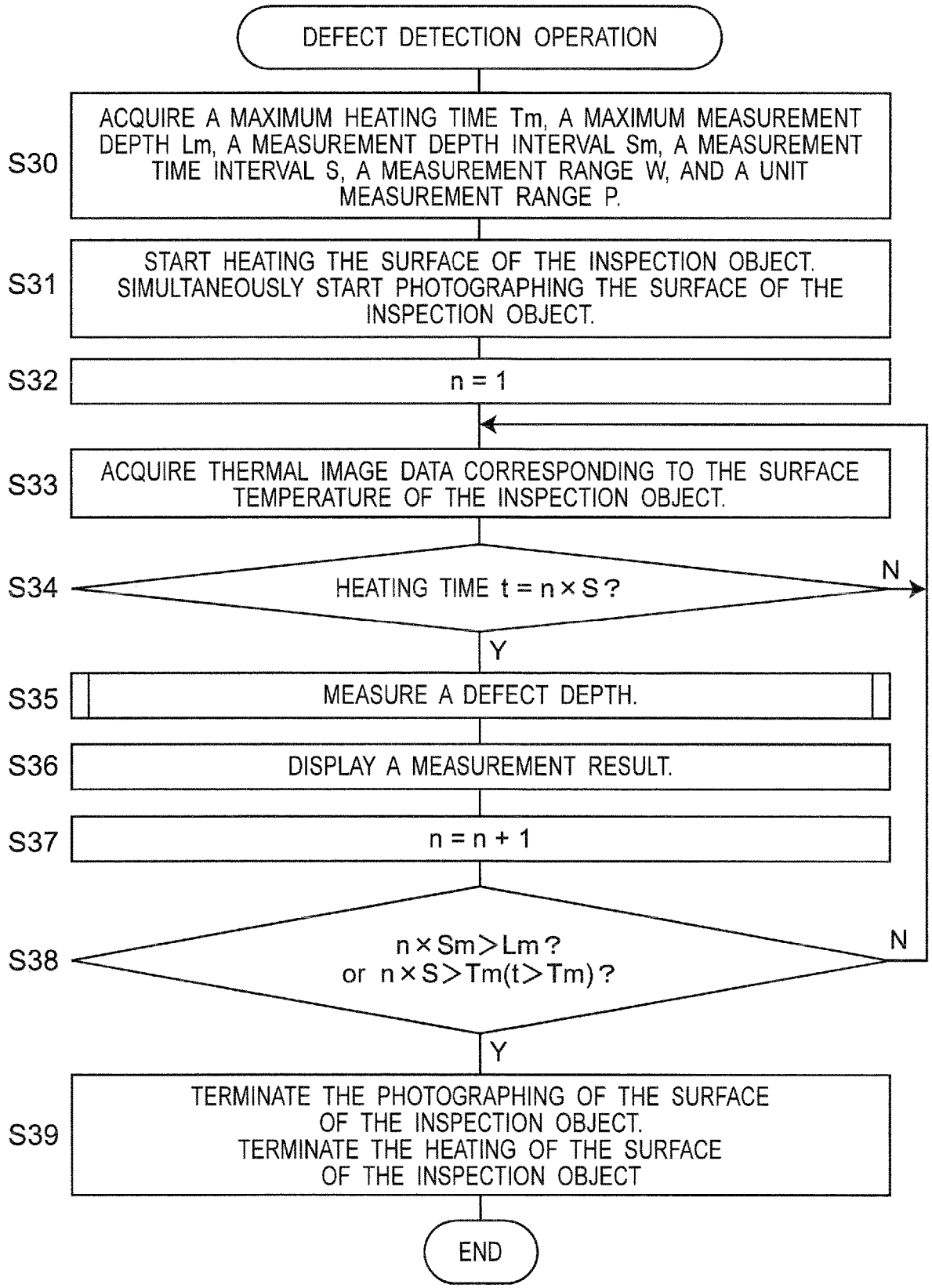
FIG. 12 is a diagram of a defect detection operation by the controller of the defect detection device according to a third embodiment

A defect detection operation by the controller 35 of the defect inspection device 30 according to the third embodiment will hereinafter be described with reference to a flowchart of FIG. 12.

First, operations of steps S30, S31 are performed. The operations of steps S30, S31 are the same as the operations of steps S20, S21, respectively, described above. As a result, the heating of the surface of the inspection object is started, and the photographing of the surface of the inspection object is started.

The controller 35 then sets n to the initial value 1 at this point (S32).

An operation of step S33 is then performed. The operation of step S33 is the same as the operation of steps S22, S12 described above. As a result, the acquisition of thermal image data is started.

The controller 35 then determines whether the heating time t reaches the measurement time n×S from the start of heating (S34), and if the heating time t does not reach n×S, the operation returns to S33 and the acquisition of the thermal image data is continued.

On the other hand, if the heating time t reaches n×S, the defect depth is measured by using thermal image data measured in the time n×S (S35). The measurement of the defect depth (S35) is the same as step S26, i.e., the defect depth measurement operation of FIG. 11.

When the measurement of the defect depth is completed at each stage of the measurement depth n×S, the controller 35 displays the measurement result of the defect depth on the display unit 36 in real time (S36).

The controller 35 then increases n by 1 to change the depth of the measurement object (S37).

The controller 35 then determines whether the measurement depth n×Sm exceeds the maximum measurement depth Lm or whether the measurement time n×S exceeds the maximum heating time Tm (S28), and if n×Sm does not exceed Lm and n×S does not exceed Tm, the operation returns to step S33, and the controller 35 measures in real time the depth of the defect existing up to the measurement depth n×Sm in stages for the measurement depth n×Sm while acquiring the thermal image data.

On the other hand, if n×Sm exceeds Lm or n×S exceeds Tm at step S38, the controller 35 determines that the heating time t exceeds the maximum heating time Tm, and terminates the photographing of the surface of the inspection object and the heating of the surface of the inspection object (S14) as insteps S24, S14 described above to complete the defect detection process.

As described above, also in this embodiment, since the fitting of the theoretical equation of Eq. (1) is performed to the temperature curve obtained from the thermal image data actually measured during heating, the defect depth can be obtained from the thermal image data acquired in a relatively short heating time from the start of heating. This can result in shortening of the time of heating of the surface of the inspection object and the measurement time from the heating to measurement of the defect depth.

Furthermore, in this embodiment, the defect depth information measured in stages in real time at the measurement depth interval Sm for the maximum measurement depth Lm can be displayed in stages in real time.

Fourth Embodiment

In the first embodiment, the theoretical equation of Eq. (1) obtained from the heat conduction equation is used as the theoretical equation for fitting to the actually measured temperature curve of temperature change of the inspection object surface. In this embodiment, a theoretical equation of Eq. (1a) is used instead of Eq. (1). Hereinafter, a function with a hat symbol "^" in an equation indicates that the function is acquired by Laplace transform of the function without the hat for time t.

[Math 6]

$$\hat{T}(L, s) = -\frac{a\sqrt{b}}{s} \frac{\cosh\sqrt{\frac{s}{b}}}{\sqrt{s}\sinh\sqrt{\frac{s}{b}} + \frac{a}{F_0}h_1\sqrt{b}\cosh\sqrt{\frac{s}{b}}} \quad (1a)$$

$$a = \frac{F_0 L}{k} \tag{2a}$$

$$b = \frac{\alpha}{L^2} \tag{3a}$$

Heat transfer phenomena in thermal hydraulics include three phenomena of heat conduction, heat convection, and heat radiation. The heat conduction is a phenomenon in which heat moves from the high temperature side to the low temperature side inside a solid. The heat transfer is a phenomenon in which heat moves between a solid wall and a fluid (e.g., air). The heat radiation is a phenomenon in which heat is released from a solid.

In the theoretical equation of Eq. (1) of the first embodiment, the heat transfer and the heat radiation are not taken into consideration. In contrast, in this embodiment, the heat transfer is taken into consideration in addition to the heat conduction as shown in the theoretical equation of Eq. (1a).

Although the theoretical equation of Eq. (1) is represented as a time function (t function), the theoretical equation of Eq. (1a) is represented as an s function acquired by Laplace transform of the time function (t function) for simplification of processing.

(1) Derivation of the Theoretical Equation (S Function) of Eq. (1) (Derivation of the Theoretical Equation of Temperature Change Taking Only the Heat Conduction into Consideration)

Figure 17A:
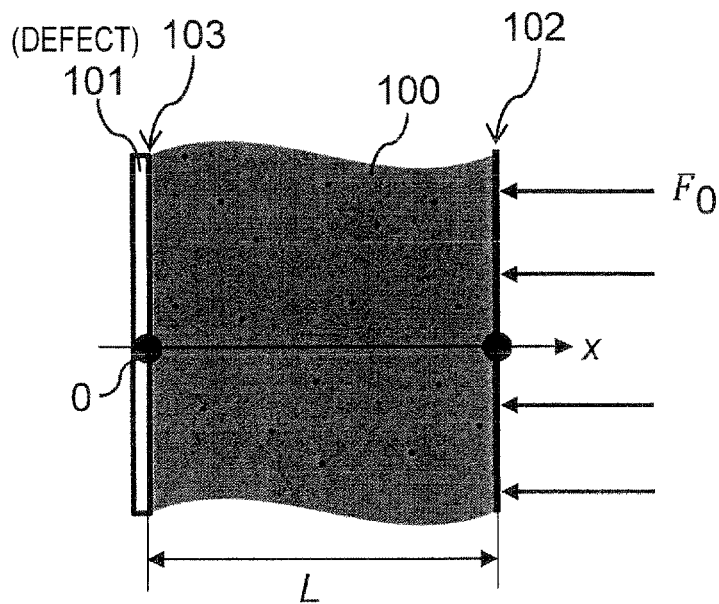
FIG. 17A is a schematic for explaining heat conduction.

First, for comparison with the theoretical equation of Eq. (1a), the theoretical equation of the time function of Eq. (1) is represented again by a theoretical equation of the s function (Eq. (1s)). FIG. 17A is a schematic for explaining heat conduction. As shown in FIG. 17A, application of a constant heat flux $F_0$ (see FIG. 7) to a front surface 102 of the inspection object 100 causes heat conduction such that heat moves inside the inspection object 100 from the front surface 102 to a back surface 103 toward the defect 101. In FIG. 17A, L is the depth of the defect 101 from the front surface 102 to the back surface 103 of the inspection object 100. A position x of the back surface 103 is denoted by 0, and a position x of the front surface 102 is denoted by L.

By laplace transform of Eq. (0) described above, i.e., the one-dimensional unsteady heat conduction equation of the time function (t function) described above, the heat conduction equation of the s function is derived as Eq. (10).

[Math 7]

$$s\hat{T}(x,s) = \alpha \frac{\partial^2 \hat{T}(x,s)}{\partial x^2} \tag{10}$$

The general solution of the heat conduction equation of the s function of Eq. (10) is derived as Eq. (11).

[Math 8]

$$\hat{T}(x,s) = C_1 e^{\sqrt{\frac{s}{\alpha}}x} + C_2 e^{-\sqrt{\frac{s}{\alpha}}x} \tag{11}$$

In Eq. (11), $C_1$ and $C_2$ are coefficients.

By partial differentiation of Eq. (11) with x, Eq. (12) is derived.

[Math 9]

$$\hat{q}(x,s) = -k\left(C_1 \sqrt{\frac{s}{\alpha}} e^{\sqrt{\frac{s}{\alpha}}x} - C_2 \sqrt{\frac{s}{\alpha}} e^{-\sqrt{\frac{s}{\alpha}}x}\right) \tag{12}$$

In Eq. (12), Eq. (13) is derived as the boundary condition of the position x=0 of the back surface 103 of the inspection object 100 in FIG. 17A.

[Math 10]

$$\hat{q}(0,s) = 0 \tag{13}$$

In Eq. (12), Eq. (14) is derived as the boundary condition of the position x=L of the front surface 102 of the inspection object 100 in FIG. 17A.

[Math 11]

$$\hat{q}(L,s) = \frac{F_0}{s} \tag{14}$$

By obtaining and substituting $C_1$, $C_2$ from Eqs. (12), (13), and (14) into Eq. (11), Eq. (15) is derived as a theoretical equation (s function) in a step response.

[Math 12]

$$\hat{T}(x,s) = -\frac{F_0}{ks}\sqrt{\frac{\alpha}{s}} \frac{\cosh\sqrt{\frac{s}{\alpha}}x}{\sinh\sqrt{\frac{s}{\alpha}}L} \tag{15}$$

In Eq. (15), when the defect 101 exists at the position of the depth L from the front surface 102 of the inspection object 100, x=L is satisfied, and Eq. (16) is derived.

[Math 13]

$$\hat{T}(L,s) = -\frac{F_0}{ks}\sqrt{\frac{\alpha}{s}} \frac{\cosh\sqrt{\frac{s}{\alpha}}L}{\sinh\sqrt{\frac{s}{\alpha}}L} \tag{16}$$

By converting the four parameters $F_0$, $\alpha$, k, L into two parameters a, b in Eq. (16), Eqs. (1s), (2s), and (3s) are derived as the theoretical equations of the heat conduction equation of the s function. The theoretical equations of Eqs. (1s), (2s), and (3s) of the s function correspond to Eqs. (1), (2), and (3) of the time function (t function).

[Math 14]

$$\hat{T}(L,s) = -\frac{a\sqrt{b}}{s} \frac{\cosh\sqrt{\frac{s}{b}}}{\sqrt{s}\sinh\sqrt{\frac{s}{b}}} \tag{1s}$$

[Math 15]

$$a = \frac{F_0 L}{k} \quad (2a)$$

$$b = \frac{\alpha}{L^2} \quad (3a)$$

Figure 17B:
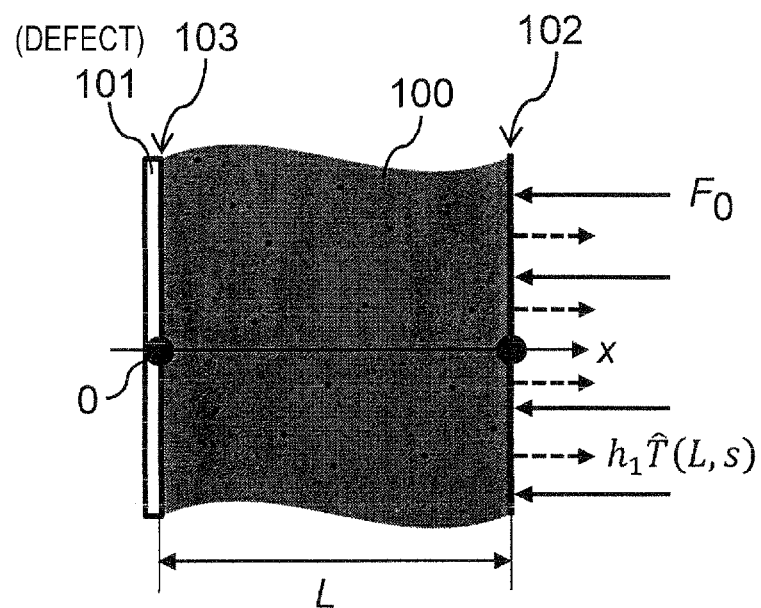
FIG. 17B is a schematic for explaining heat transfer.
Figure 17C:
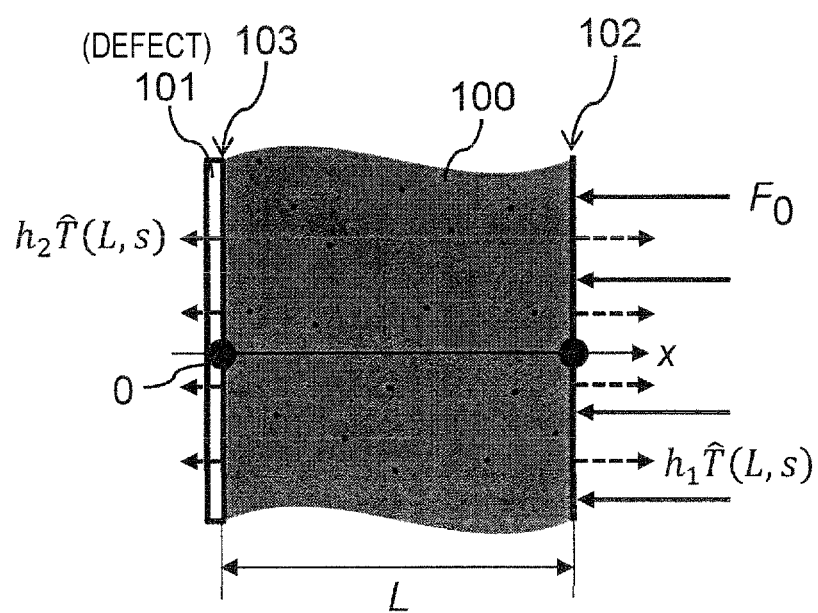
FIG. 17C is a schematic for explaining heat transfer.

(2) Derivation of the Theoretical Equation of Temperature Change Taking Heat Transfer on the Surface of the Inspection Object into Consideration Description will be made of derivation of the theoretical equation of temperature change obtained from the heat conduction equation and taking heat transfer (heat dissipation) on a front surface (heated surface) of an inspection object into consideration. FIGS. 17B and 17C are schematics for explaining heat transfer. As shown in FIG. 17B, heat transfer occurs such that heat moves as a heat flux $h_1 T(L,s)$ from the front surface 102 of the inspection object 100 to the air in contact with the front surface 102 (the hat symbol is omitted). Additionally, as shown in FIG. 17C, heat transfer occurs such that heat moves as a heat flux $h_2 T(L,s)$ from the back surface 103 of the inspection object 100 to the air in contact with the back surface 103 (the hat symbol is omitted). It is noted that $h_1$ and $h_2$ are heat transfer rates (heat transfer coefficients) [W/(m²·K)]. In this embodiment, as shown in FIG. 17B, the theoretical equation of temperature change is derived that takes into consideration only the heat transfer on the front surface 102 of the inspection object 100.

In Eq. (12) described above, Eq. (13a) is derived as the boundary condition of the position x=0 of the back surface 103 of the inspection object 100 in FIG. 17B.

[Math 16]

$$\hat{q}(0,s) = 0 \quad (13a)$$

Eq. (13a) is the same as Eq. (13) described above.

In Eq. (12) described above, Eq. (14a) is derived as the boundary condition of the position x=L of the front surface 102 of the inspection object 100 in FIG. 17A.

[Math 17]

$$\hat{q}(L, s) = \frac{F_0}{s} + h_1 \hat{T}(L, s) \quad (14a)$$

As compared to Eq. (14) described above, Eq. (14a) takes into consideration the heat flux ($h_1 T(L,s)$) of the heat transfer on the front surface 102 of the inspection object 100, in addition to the heat flux ($F_0/s$) due to heating for heat conduction (the hat symbol is omitted). By obtaining and substituting $C_1$, $C_2$ from Eqs. (12), (13a), and (14a) into Eq. (11) described above, Eq. (15a) is derived as a theoretical equation (s function) in a step response.

[Math 18]

$$\hat{T}(x,s) = -\frac{1}{2k \sinh\sqrt{\frac{s}{\alpha}} L} \sqrt{\frac{\alpha}{s}} \left( \frac{F_0}{s} + h_1 \hat{T}(L,s) \right)\left( e^{\sqrt{\frac{s}{\alpha}} x} + e^{-\sqrt{\frac{s}{\alpha}} x} \right) \quad (15a)$$

In Eq. (15a), when the defect 101 exists at the position of the depth L from the front surface 102 of the inspection object 100, x=L is satisfied, and Eq. (16a) is derived.

[Math 19]

$$\hat{T}(L, s) = \quad (16a)$$

$$\frac{k\sqrt{s} \sinh\sqrt{\frac{s}{\alpha}} L}{k\sqrt{s} \sinh\sqrt{\frac{s}{\alpha}} L + h_1 \sqrt{\alpha} \cosh\sqrt{\frac{s}{\alpha}} L} \times -\frac{F_0}{kS} \sqrt{\frac{\alpha}{s}} \frac{\cosh\sqrt{\frac{s}{\alpha}} L}{\sinh\sqrt{\frac{s}{\alpha}} L} =$$

$$-\frac{F_0 \sqrt{\alpha}}{s} \frac{\cosh\sqrt{\frac{s}{\alpha}} L}{k\sqrt{s} \sinh\sqrt{\frac{s}{\alpha}} L + h_1 \sqrt{\alpha} \cosh\sqrt{\frac{s}{\alpha}} L}$$

As compared to Eq. (16) described above, Eq. (16a) takes into consideration the heat flux of heat transfer on the front surface 102 of the inspection object 100 (the term on the left side of the multiplication sign "×" in the middle of the row of Eq. (16a)), in addition to the heat flux due to heating for heat conduction (the term on the right side of the multiplication sign "×" in the middle of the row of Eq. (16a)).

By converting the four parameters $F_0$, $\alpha$, k, L into the two parameters a, b in Eq. (16a), Eqs. (1a), (2a), and (3a) are derived as the theoretical equations of the heat conduction equation of the s function.

[Math 20]

$$\hat{T}(L, s) = -\frac{a\sqrt{b}}{s} \frac{\cosh\sqrt{\frac{s}{b}}}{\sqrt{s} \sinh\sqrt{\frac{s}{b}} + \frac{a}{F_0} h_1 \sqrt{b} \cosh\sqrt{\frac{s}{b}}} \quad (1a)$$

[Math 21]

$$a = \frac{F_0 L}{k} \quad (2a)$$

$$b = \frac{\alpha}{L^2} \quad (3a)$$

The configurations of the defect detection device 30 and the defect detection system 1 of this embodiment are basically the same as those of the first embodiment described with reference to FIG. 1, and the function and operation of the controller 35 of the defect detection device 30 are basically the same as those of the first embodiment described with reference to FIGS. 6 and 9. However, the controller 35 of the defect detection device 30 is different from the controller described above in that the theoretical equations of Eqs. (1a) to (3a) are used instead of the theoretical equations of Eqs. (1) to (3) at steps S151, S152 of FIG. 9.

Figure 9:
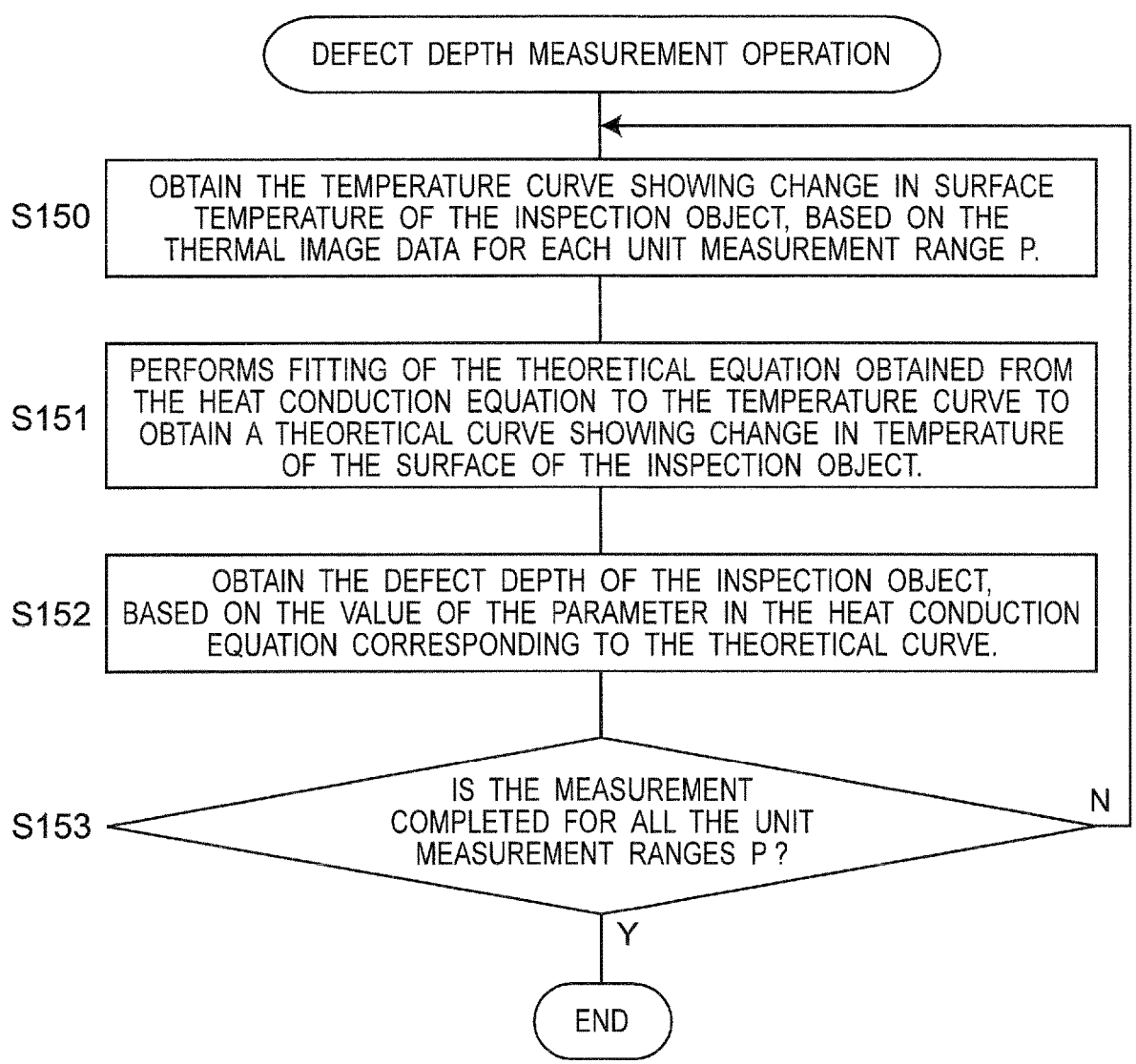
FIG. 9 is a diagram of a defect depth measurement operation by the controller of the defect detection device according to the first embodiment.

At step S151 of FIG. 9, the controller 35 performs fitting of the theoretical equation of Eq. (1a) obtained from the heat conduction equation to the actually measured temperature curve 200 of temperature change of the inspection object surface to obtain the theoretical curve 201 showing a temporal change in temperature of the surface of the inspection object (see FIG. 4). Subsequently, at step S152, the controller 35 obtains the defect depth L of the inspection object by using Eq. (3s) from the value of the parameter b in the theoretical on of Eq (1a) corresponding to the theoretical curve 201.

As described above, also in this embodiment, since the fitting of the theoretical equation of Eq. (1a) is performed to the temperature curve obtained from the thermal image data actually measured during heating, the defect depth can be obtained from the thermal image data acquired in a relatively short heating time from the start of heating. This can result in shortening of the time of heating of the surface of the inspection object and the measurement time from the heating to measurement of the defect depth.

If a theoretical curve is obtained by fitting to the actually measured temperature curve by using the theoretical equations of Eqs. (1) to (3) taking only heat conduction into consideration, and a defect depth of the inspection object is obtained from the value of the parameter b in the theoretical equation corresponding to the theoretical curve, the following problem occurs. Specifically, when the depth of the defect of the inspection object becomes deeper, the depth of the defect is measured deeper than the actual depth as the heating time (the number of measurement data) increases (see Example 3 described later).

This is because when the defect depth of the inspection object is deeper, the heating time must be made longer as described above with reference to FIG. 5. If the heating time is made longer, the influence of heat transfer (heat dissipation) becomes non-negligible.

In this regard, in this embodiment, a theoretical curve is obtained by fitting to the actually measured temperature curve by using the theoretical equation of Eq. (1a) taking into consideration the heat transfer (heat dissipation) on the front surface (heated surface) of the inspection object in addition to the heat conduction, and the depth of the defect of the inspection object obtained by using Eq. (3s) is obtained from the value of the parameter b in the theoretical equation corresponding to the theoretical curve. Therefore, even when the depth of the defect of the inspection object becomes deeper, the defect depth L can be obtained with higher accuracy.

Fifth Embodiment

In the fourth embodiment, the theoretical equation used for fitting to the actually measured temperature curve of temperature change of the inspection object surface is the theoretical equation of Eq. (1a) taking into consideration the heat conduction as well as the heat transfer (heat dissipation) on the front surface (heated surface) of the inspection object. In this embodiment, a theoretical equation of Eq. (1b) also taking into consideration the heat transfer (heat dissipation) on the back surface (defect side) of the inspection object is used instead of Eq. (1a).

[Math 22]

$$\hat{T}(L, s) = -\frac{a\sqrt{\frac{s}{b}}\cosh\sqrt{\frac{s}{b}} + ad\sinh\sqrt{\frac{s}{b}}}{\left(\frac{s^2}{b} + sed\right)\sinh\sqrt{\frac{s}{b}} + (e+d)\sqrt{\frac{s}{b}}s\cosh\sqrt{\frac{s}{b}}} \quad (1b)$$

$$a = \frac{F_0 L}{k} \quad (2b)$$

$$b = \frac{\alpha}{L^2} \quad (3b)$$

$$e = \frac{h_1 L}{k} \quad (4b)$$

$$d = \frac{h_2 L}{k} \quad (5b)$$

Description will hereinafter be made of derivation of the theoretical equation (1b) of temperature change obtained from the heat conduction equation and taking into consideration the heat transfer (heat dissipation) on the front surface (heated surface) and the back surface (defect side) of the inspection object, as shown in FIG. 17C.

In Eq. (12) described above, Eq. (13b) is derived as the boundary condition of the position x=0 of the back surface 103 of the inspection object 100 in FIG. 17C.

[Math 23]

$$\hat{q}(0,s) = -h_2 \hat{T}(0,s) \quad (13b)$$

As compared to Eqs. (13) and (13a) described above, Eq. (13b) takes into consideration a heat flux ($h_2 T(0, s)$) of the heat transfer on the back surface 103 of the inspection object 100 (the hat symbol is omitted).

In Eq. (12) described above, Eq. (14b) is derived as the boundary condition of the position x=L of the front surface 102 of the inspection object 100 in FIG. 17C.

[Math 24]

$$\hat{q}(L, s) = \frac{F_0}{s} + h_1 \hat{T}(L, s) \quad (14b)$$

Eq. (14b) is the same as Eq. (14a) described above.

By obtaining and substituting $C_1$, $C_2$ from Eqs. (12), (13b), and (14b) into Eq. (11) described above, Eq. (15b) is derived as a theoretical equation (s function) in a step response.

[Math 25]

$$\hat{T}(x, s) = \frac{F_0 + sh_1 \hat{T}(L, s) + sh_2 e^{-\sqrt{\frac{s}{\alpha}}L}\hat{T}(0, s)}{2ks\sinh\sqrt{\frac{s}{\alpha}}L}\sqrt{\frac{\alpha}{s}}e^{\sqrt{\frac{s}{\alpha}}x} - \frac{F_0 + sh_1 \hat{T}(L, s) + sh_2 e^{\sqrt{\frac{s}{\alpha}}L}\hat{T}(0, s)}{2ks\sinh\sqrt{\frac{s}{\alpha}}L}\sqrt{\frac{\alpha}{s}}e^{-\sqrt{\frac{s}{\alpha}}x} \quad (15b)$$

In Eq. (15b), when x=0, Eq. (17) is derived.

[Math 26]

$$\hat{T}(0, s) = -\frac{F_0 + sh_1 \hat{T}(L, s)}{ks\sqrt{\frac{s}{\alpha}}\sinh\sqrt{\frac{s}{\alpha}}L + sh_2\cosh\sqrt{\frac{s}{\alpha}}L} \quad (17)$$

In Eq. (15b), when the defect 101 exists at the position of the depth L from the front surface 102 of the inspection object 100, x=L is satisfied, and Eq. (18) is derived.

[Math 27]

$$\hat{T}(L,s) = -\sqrt{\frac{\alpha}{s}} \frac{F_0 e^{\sqrt{\frac{s}{\alpha}}L} + sh_1\hat{T}(L,s)e^{\sqrt{\frac{s}{\alpha}}L} + sh_2\hat{T}(0,s) +}{2ks\sinh\sqrt{\frac{s}{\alpha}}L} \quad (18)$$
$$\frac{F_0 e^{-\sqrt{\frac{s}{\alpha}}L} + sh_1\hat{T}(L,s)e^{-\sqrt{\frac{s}{\alpha}}L} + sh_2\hat{T}(0,s)}{}$$

From Eqs. (17) and (18), Eq. (16b) is derived.

[Math 28]

$$\hat{T}(L,s) = \quad (16b)$$

$$-\frac{F_0\sqrt{\frac{s}{\alpha}}k\cosh\sqrt{\frac{s}{\alpha}}L + F_0 h_2 \sinh\sqrt{\frac{s}{\alpha}}L}{\left(\frac{k^2 s^2}{\alpha} + sh_1 h_2\right)\sinh\sqrt{\frac{s}{\alpha}}L + (h_1 + h_2)\sqrt{\frac{s}{\alpha}}k\cosh\sqrt{\frac{s}{\alpha}}L}$$

By converting six parameters $F_0$, $\alpha$, $k$, $L$, $h_1$, $h_2$ into four parameters a, b, d, e in Eq. (16b), Eqs. (1b) and (2b) to (5b) are derived as the theoretical equations of the heat conduction equation of the s function.

[Math 29]

$$\hat{T}(L,s) = -\frac{a\sqrt{\frac{s}{b}}\cosh\sqrt{\frac{s}{b}} + ad\sinh\sqrt{\frac{s}{b}}}{\left(\frac{s^2}{b} + sed\right)\sinh\sqrt{\frac{s}{b}} + (e+d)\sqrt{\frac{s}{b}}s\cosh\sqrt{\frac{s}{b}}} \quad (1b)$$

[Math 30]

$$a = \frac{F_0 L}{k} \quad (2b)$$

$$b = \frac{\alpha}{L^2} \quad (3b)$$

$$e = \frac{h_1 L}{k} \quad (4b)$$

$$d = \frac{h_2 L}{k} \quad (5b)$$

The configurations of the defect detection device 30 and the defect detection system 1 of this embodiment are basically the same as those of the first embodiment described with reference to FIG. 1, and the function and operation of the controller 35 of the defect detection device 30 are basically the same as those of the first embodiment described with reference to FIGS. 6 and 9. However, the controller 35 of the defect detection device 30 is different from the controller described above in that the theoretical equations of Eqs. (1b) to (5b) are used, instead of the theoretical equations of Eqs. (1) to (3), at steps S151, S152 of FIG. 9.

At step S151 of FIG. 9, the controller 35 performs fitting of the theoretical equation of Eq. (1b) obtained from the heat conduction equation to the actually measured temperature curve 200 of temperature change of the inspection object surface to obtain the theoretical curve 201 showing a temporal change in temperature of the surface of the inspection object (see FIG. 4). Subsequently, at step S152, the controller 35 obtains the defect depth L of the inspection object by using Eq. (3b) from the value of the parameter b in the theoretical equation of Eq. (1b) corresponding to the theoretical curve 201.

As described above, also in this embodiment, since the fitting of the theoretical equation of Eq. (1b) is performed to the temperature curve obtained from the thermal image data actually measured during heating, the defect depth can be obtained from the thermal image data acquired in a relatively short heating time from the start of heating. This can result in shortening of the time of heating of the surface of the inspection object and the measurement time from the heating to measurement of the defect depth.

Furthermore, in this embodiment, a theoretical curve is obtained by fitting to the actually measured temperature curve by using the theoretical equation of Eq. (1b) also taking into consideration the heat transfer (heat dissipation) on the back surface (defect side) of the inspection object in addition to the heat conduction and the heat transfer (heat dissipation) on the front surface (heated surface) of the inspection object, and the depth of the defect of the inspection object obtained by using Eq. (3b) is obtained from the value of the parameter b in the theoretical equation corresponding to the theoretical curve. Therefore, even when the depth of the defect of the inspection object becomes deeper, the defect depth L can be obtained with higher accuracy.

Sixth Embodiment

In the fifth embodiment, the theoretical equation used for performing fitting to the actually measured temperature curve of the temperature change of the inspection object surface is the theoretical equation of Eq. (1b) taking into consideration the heat conduction as well as the heat transfer (heat dissipation) on the front surface (heated surface) and the back surface (defect side) of the inspection object. In this embodiment, a theoretical equation of Eq. (1c) also taking the heat radiation into consideration is used instead of Eq. (1b).

[Math 31]

$$\hat{T}(L,s) = -\frac{a\sqrt{\frac{s}{b}}\cosh\sqrt{\frac{s}{b}} + ad\sinh\sqrt{\frac{s}{b}}}{\left(\frac{s^2}{b} + sed\right)\sinh\sqrt{\frac{s}{b}} + (e+d)\sqrt{\frac{s}{b}}s\cosh\sqrt{\frac{s}{b}}} \quad (1c)$$

$$a = \frac{F_0 L}{k} \quad (2c)$$

$$b = \frac{\alpha}{L^2} \quad (3c)$$

$$e = \frac{h'_1 L}{k} \quad (4c)$$

$$d = \frac{h'_2 L}{k} \quad (5c)$$

Description will hereinafter be made of derivation of the theoretical equation (1c) of temperature change obtained from the heat conduction equation and taking into consideration the heat transfer (heat dissipation) on the front surface (heated surface) and the back surface (defect side) of the inspection object as well as the heat radiation.

In Eq. (12) described above, Eq. (13c) is derived as the boundary condition of the position x=0 of the back surface 103 of the inspection object 100.

[Math 32]

$$\hat{q}(0,s) = -h_2\hat{T}(0,s) - \sigma(\hat{T}_1^4(0,s) - \hat{T}_0^4) \cong -h'_2\hat{T}(0,s) \quad (13c)$$

As compared to Eq. (13b) described above, Eq. (13c) takes into consideration a heat flux ($\delta(T_1^4(0, s) - T_3^4)$) of the heat radiation on the back surface 103 of the inspection object 100, in addition to the heat flux ($h_2T(0,s)$) of the heat transfer on the back surface 103 of the inspection object 100 (the hat symbol is omitted). $T_0$ is an initial temperature (temperature before heat radiation) and $T_1(0, s)$ is a temperature after heat radiation (the hat symbol is omitted).

Assuming that $(-h_2T(0, s) - \delta(T_1^4(0, s) - T_0^4))$ is $(-h'_2T(0, s))$ (the hat symbol is omitted), Eq. (13c) is the same as Eq. (13b) While $h'_2T(0, s)$ denotes the heat flux of heat transfer and heat radiation on the back surface 103 of the inspection object 100 (the hat symbol is omitted), $h'_2$ denotes the heat transfer rate [W/(m²·K)] of the heat transfer and the heat radiation.

In Eq. (12) described above, Eq. (14c) is derived as the boundary condition of the position x=L of the front surface 102 of the inspection object 100.

[Math 33]

$$\hat{q}(L, s) = \frac{F_0}{s} + h_1\hat{T}(L, s) + \sigma(\hat{T}_1^4(L, s) - \hat{T}_0^4) \cong \frac{F_0}{s} + h'_1\hat{T}(L, s) \quad (14c)$$

As compared to Eq. (14b) described above, Eq. (14c) takes into consideration a heat flux ($\delta(T_1^4(L,s) - T_0^4)$) of the heat radiation on the front surface 102 of the inspection object 100, in addition to the heat flux ($h_1T(L,s)$) of the heat transfer on the front surface 102 of the inspection object 100 (the hat symbol is omitted). $T_1$ is a temperature after heat radiation (the hat symbol is omitted).

Assuming that $(-h_1T(L,s) - \delta(T_1^4(L,s) - T_0^4))$ is $(-h'_1T(L,s))$ (the hat symbol is omitted), Eq. (14c) is the same as Eq. (14b). While $h'_1T(L,s)$ denotes the total heat flux of heat transfer and heat radiation on the front surface 102 of the inspection object 100 (the hat symbol is omitted), $h'_1$ denotes the heat transfer rate [W/(m²·K)] of the heat transfer and the heat radiation.

By obtaining and substituting $C_1$, $C_2$ from Eqs. (12), (13c), and (14c) into Eq. (11) described above and performing the same calculation as the fifth embodiment, Eqs. (1c) and (2c) to (5c) are derived as theoretical equations of the heat conduction equation of the s function.

[Math 34]

$$\hat{T}(L, s) = -\frac{a\sqrt{\frac{s}{b}}\cosh\sqrt{\frac{s}{b}} + ad\sinh\sqrt{\frac{s}{b}}}{\left(\frac{s^2}{b} + sed\right)\sinh\sqrt{\frac{s}{b}} + (e+d)\sqrt{\frac{s}{b}}s\cosh\sqrt{\frac{s}{b}}} \quad (1c)$$

(when $h'_1 \neq h'_2$)

[Math 35]

$$a = \frac{F_0 L}{k} \quad (2c)$$

$$b = \frac{\alpha}{L^2} \quad (3c)$$

$$e = \frac{h'_1 L}{k} \quad (4c)$$

$$d = \frac{h'_2 L}{k} \quad (5c)$$

When the heat transfer rates of the heat transfer and the heat radiation of the front surface 102 of the inspection object 100 are equal to the heat transfer rates of the heat transfer and the heat radiation of the back surface 103 (when $h'_1 = h'_2$), e=d is satisfied, and Eq. (1c) is represented as Eq. (1c').

[Math 36]

$$\hat{T}(L, s) = -\frac{a\sqrt{\frac{s}{b}}\cosh\sqrt{\frac{s}{b}} + ad\sinh\sqrt{\frac{s}{b}}}{\left(\frac{s^2}{b} + sd^2\right)\sinh\sqrt{\frac{s}{b}} + 2d\sqrt{\frac{s}{b}}s\cosh\sqrt{\frac{s}{b}}} \quad (1c')$$

The configurations of the defect detection device 30 and the defect detection system 1 of this embodiment are basically the same as those of the first embodiment described with reference to FIG. 1, and the function and operation of the controller 35 of the defect detection device 30 are basically the same as those of the first embodiment described with reference to FIGS. 6 and 9. However, the controller 35 of the defect detection device 30 is different from the controller described above in that the theoretical equations of Eqs. (1c) to (5c) are used, instead of the theoretical equations of Eqs. (1) to (3), at steps S151, S152 of FIG. 9.

At step S151 of FIG. 9, the controller 35 performs fitting of the theoretical equation of Eq. (1c) obtained from the heat conduction equation to the actually measured temperature curve 200 of temperature change of the inspection object surface to obtain the theoretical curve 201 showing a temporal change in temperature of the surface of the inspection object (see FIG. 4). Subsequently, at step S152, the controller 35 obtains the defect depth L of the inspection object by using Eq. (3c) from the value of the parameter b in the theoretical equation of Eq. (1c) corresponding to the theoretical curve 201.

As described above, also in this embodiment, since the fitting of the theoretical equation of Eq. (1c) is performed to the temperature curve obtained from the thermal image data actually measured during heating, the defect depth can be obtained from the thermal image data acquired in a relatively short heating time from the start of heating. This can result in shortening of the time of heating of the surface of the inspection object and the measurement time from the heating to measurement of the defect depth.

Furthermore, in this embodiment, a theoretical curve is obtained by fitting to the actually measured temperature curve by using the theoretical equation of Eq. (1c) also taking the heat radiation into consideration in addition to the heat conduction and the heat transfer (heat dissipation) on the front surface (heated surface) and the back surface (defect side) of the inspection object, and the depth of the defect of the inspection object obtained by using Eq. (3b) is obtained from the value of the parameter b in the theoretical equation corresponding to the theoretical curve. Therefore, even when the depth of the defect of the inspection object becomes deeper, the defect depth L can be obtained with higher accuracy.

Other Embodiments

The first to sixth embodiments have been described above as exemplifications of the techniques disclosed in this application. However, the techniques of this disclosure are not limited thereto and are applicable to embodiments with modification, replacement, addition, omission, etc. made as appropriate. The constituent elements described in the first to sixth embodiments can be combined to form a new embodiment. Therefore, other embodiments will hereinafter exemplarily be described.

In the first to sixth embodiments, a method and a device for measuring a depth of a defect inside an inspection object have been described. The idea of the present disclosure is applicable not only to the measurement of the depth of the defect inside the inspection object but also to a method and a device for measuring a thickness of a measurement object. In the first to sixth embodiments, a distance from an inspection object surface to an internal defect (cavity, separation) is obtained as the depth of the defect. Measuring the distance from the inspection object surface to the internal cavity or separation is the same as measuring the thickness of the measurement object. Therefore, the method of measuring a defect depth of an inspection object described in the first to sixth embodiments is obviously applicable to the method of measuring a thickness of a measurement object.

Figure 13:
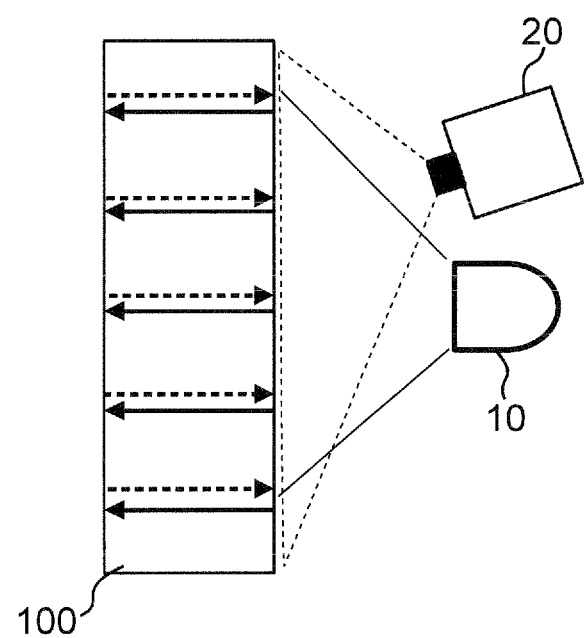
FIG. 13 is a diagram for explaining an overview of a thickness measurement.

In other words, as shown in FIG. 13, when the front surface of the measurement object 100 is heated by the heating device 10 such as a halogen lamp etc., heat reflection occurs on the back surface of the measurement object 100, so that a temporal change in temperature of the front surface of the measurement object 100 differs depending on the thickness of the measurement object 100. Therefore, also in thickness measurement, if the surface of the measurement object 100 is photographed by the photographing device 20 such as an infrared camera while the surface of the measurement object 100 is heated by the heating device 10, the thickness can be measured based on the same idea as the defect detection method of the first embodiment. In this case, in the description of the first embodiment, the terms "defect detection device", "defect detection system", "inspection object", "defect depth", "defect detection operation, defect depth measurement operation", and "maximum measurement depth" may be replaced with "thickness measurement device", "thickness measurement system", "measurement object", "thickness", "thickness measurement operation", and "maximum measurement thickness", respectively.

The embodiments have been described as exemplifications of the techniques in this disclosure. For this purpose, the accompanying drawings and the detailed description are provided. Therefore, the constituent elements described in the accompanying drawings and the detailed description may include not only the constituent elements essential for solving the problem but also constituent elements not essential for solving the problem for the purpose of illustrating the techniques. Therefore, even though those non-essential constituent elements are described in the accompanying drawings and the detailed description, these non-essential constituent elements should not immediately be recognized as being essential. Since the embodiments described above are intended to illustrate the techniques of this disclosure, various modifications, replacements, additions, omissions, etc. can be made within the claims and the scope equivalent thereto.

EXAMPLES

Example 1

By using the defect detection system 1 of the first embodiment, a depth from a front surface to a back surface of a mortar plate material (275 mm×210 mm, 11.1-mm-thick) was measured as a defect depth. For the heating device 10, a quake-resistant light control type work lamp CTW-050 (manufactured by CUSTOM KOBO) was used.

Figure 14A:
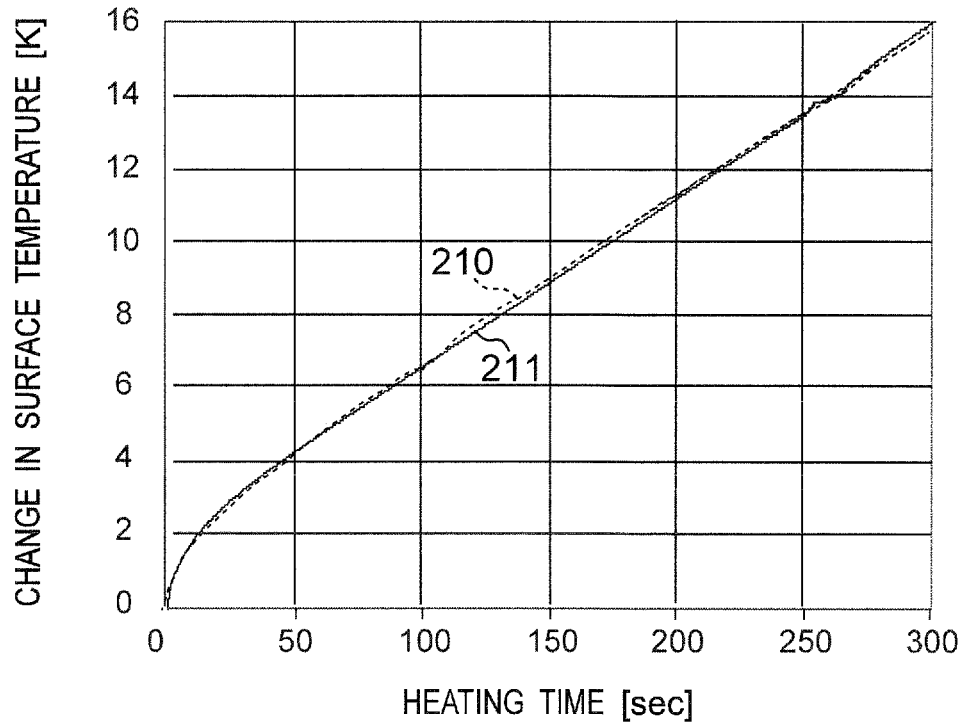
FIG. 14a is a diagram of a temperature curve obtained from actually measured thermal image data in Example 1 and a theoretical curve obtained by fitting a theoretical equation to the actually measured temperature curve.

FIG. 14(a) shows a temperature curve obtained from actually measured thermal image data and a theoretical curve obtained from the theoretical equation of Eq. (1). A broken line 210 is the temperature curve of temperature change of an inspection object surface obtained from the actually measured thermal image data, and a solid line 211 is the theoretical curve of temperature change of the inspection object surface obtained by curve fitting of the theoretical equation of Eq. (1) to the temperature curve 210.

Figure 14B:
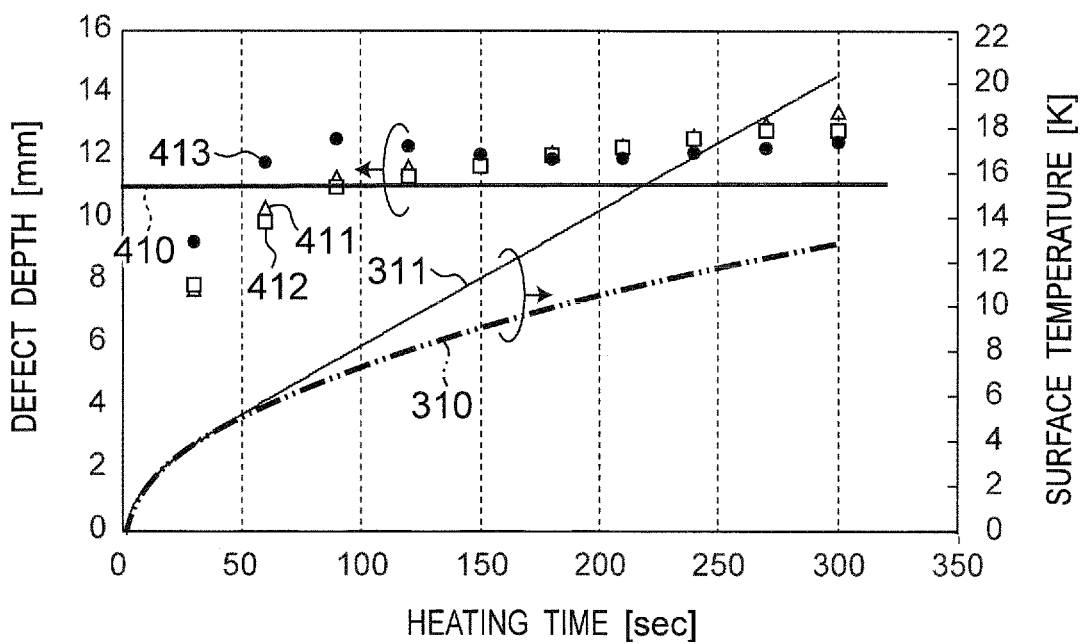
FIG. 14b is a diagram of a measurement result of a depth of a defect of an inspection object in Example 1.

FIG. 14(b) shows the depth L of the defect of the inspection object obtained by using Eq. (3) from the value of the parameter b in the theoretical equation corresponding to the theoretical curve 211. FIG. 14(b) includes a white triangle mark 411 that is a measurement result of the depth L of the defect when the radiation distance of the heating device 10 to the mortar plate material is 30 cm, a white square mark 412 that is a measurement result of the depth L of the defect when the radiation distance is 40 cm, and a black circle mark 413 that is a measurement result of the depth L of the defect when the radiation distance is 50 cm. FIG. 14(b) shows a measurement result of the depth L of the defect when the heating time is changed from 30 seconds to 300 seconds in increments of 30 seconds for each of the radiation distances. A solid line 410 shows the actual thickness of 11.1 mm.

From FIG. 14(b), it can be seen that the depth L of the defect can accurately be obtained while shortening the measurement time, by setting the heating time to about 60 seconds without depending on the radiation distance, i.e., the intensity of heating.

FIG. 14(b) further shows a temperature curve 310 of the sound portion and a temperature curve 311 of the defective portion, obtained from the theoretical equation of Eq. (1). The defect depth of the defective portion is set to L=11.1 mm, while the sound portion is set to an L value that is sufficiently large with respect to the defect depth of the defective portion. This reveals that appropriate setting of the heating time is about 60 seconds when a difference appears between the surface temperature of the sound portion and the surface temperature of the defective portion.

Example 2

By using the defect detection system 1 of the first embodiment, a thickness of an aluminum plate material (30 mm×165 mm, 15-mm-thick) was measured. The same heating device 10 as Example 1 was used. The radiation distance of the heating device 10 to the aluminum plate material was 30 cm, and the heating time was 60 seconds.

Figures 15A, 15B, 15C:
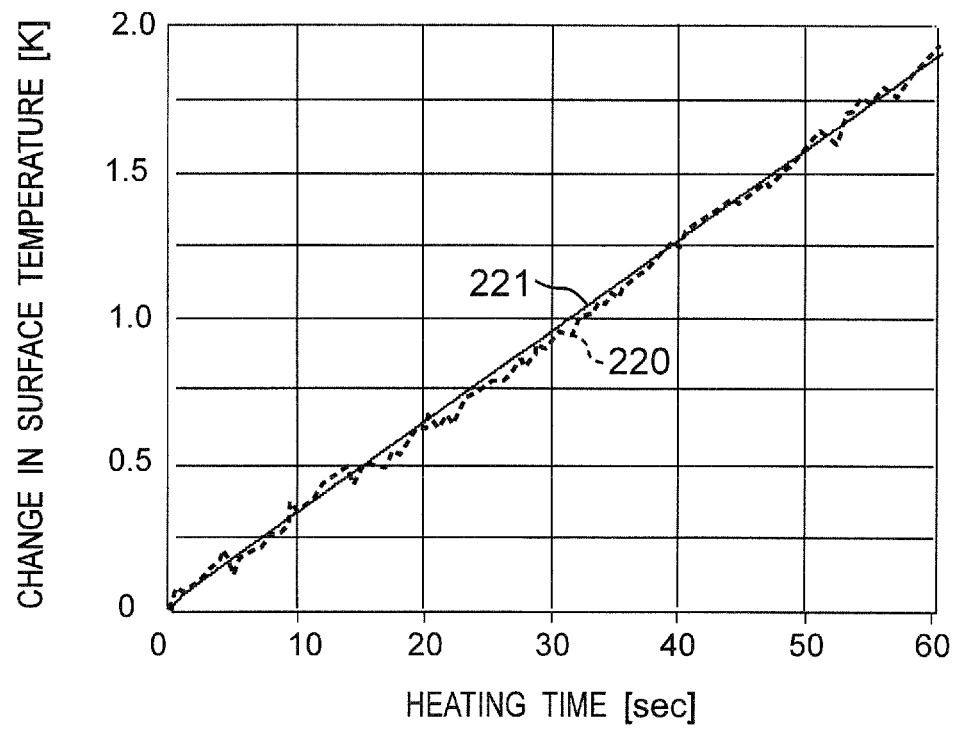
FIG. 15a is a diagram of a temperature curve obtained from actually measured thermal image data in Example 2 and a theoretical curve obtained by fitting a theoretical equation to the actually measured temperature curve.
FIG. 15b is a diagram of a result of the fitting using the theoretical equation in Example 2.
FIG. 15c is a diagram of a measurement result of thickness of a measurement object in Example 2.

FIG. 15(a) shows a temperature curve 220 obtained from actually measured thermal image data and a theoretical curve obtained from the theoretical equation of Eq. (1). The broken line 220 is the temperature curve of temperature change of an inspection object surface obtained from the actually measured thermal image data, and a solid line 221 is the theoretical curve of temperature change of the inspection object surface obtained by curve fitting of the theoretical equation of Eq. (1) to the temperature curve 220.

FIG. 15(b) shows values of the parameters a, b (fitting results) in the theoretical equation corresponding to the theoretical curve 221 obtained by curve fitting, and b (calculated value) calculated by using Eq. (3) from the material constant α of aluminum and L=15 mm.

FIG. 15(c) shows the depth L (measurement result) of the defect of the inspection object obtained using Eq. (3) from the b value of the fitting result of FIG. 15(b) and the actual value of 15 mm. This reveals that even when the defect detection system 1 of the first embodiment is used as the thickness measurement system, the thickness L can accurately be obtained while shortening the measurement time by setting the heating time to about 60 seconds.

Example 3

By using the defect detection system 1 of the fourth embodiment, a depth from a front surface to a back surface was measured as a defect depth for three mortar plate materials different in thickness (275 mm×210 mm, 11.1-mm-, 22.1-mm-, 30.5-mm-thick). The same heating device 10 as Example 1 was used.

Figure 18A:
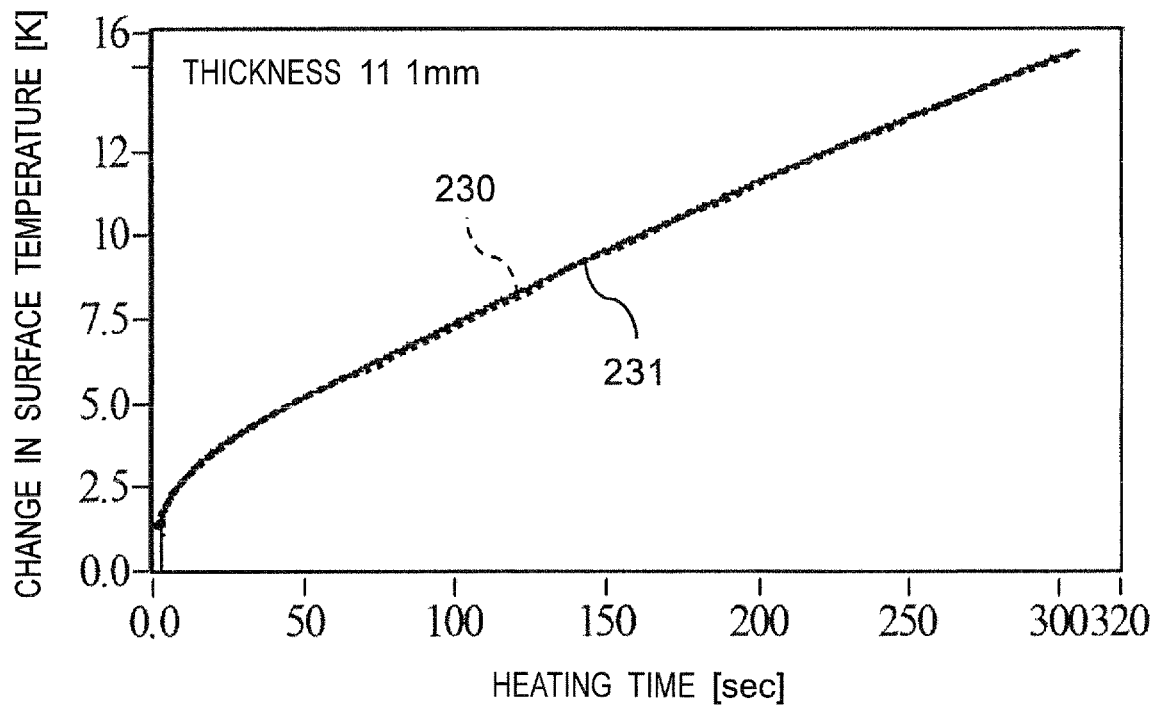
FIG. 18A is a diagram of a temperature curve obtained from actually measured thermal image data in Example 3 and a theoretical curve obtained by fitting to the actually measured temperature curve a theoretical equation taking heat conduction and heat transfer into consideration.
Figure 18B:
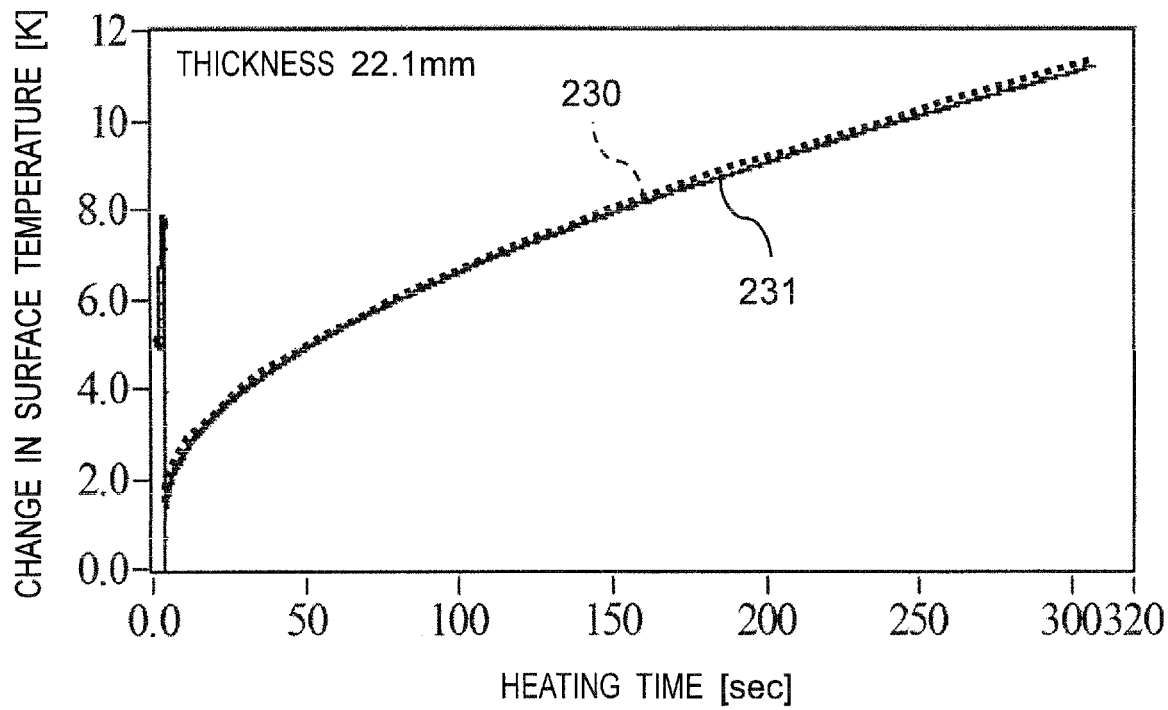
FIG. 18B is a diagram of a temperature curve obtained from actually measured thermal image data in Example 3 and a theoretical curve obtained by fitting to the actually measured temperature curve a theoretical equation taking heat conduction and heat transfer into consideration.
Figure 18C:
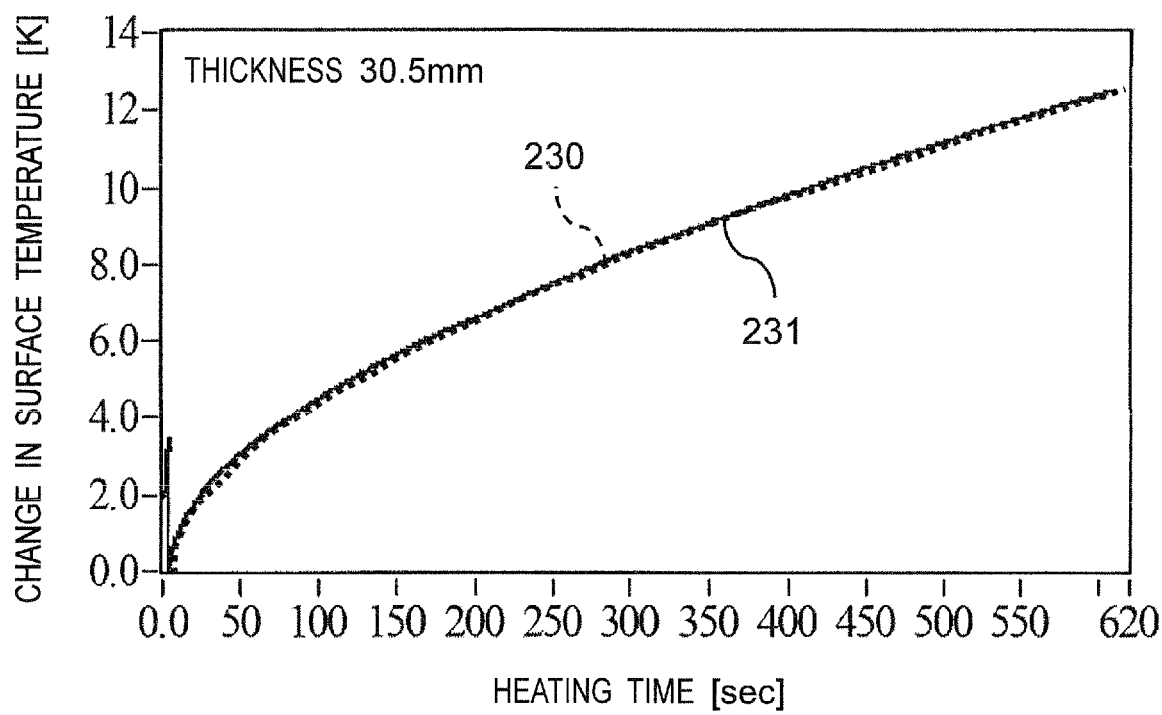
FIG. 18C is a diagram of a temperature curve obtained from actually measured thermal image data in Example 3 and a theoretical curve obtained by fitting to the actually measured temperature curve a theoretical equation taking heat conduction and heat transfer into consideration.

FIGS. 18A to 18C show temperature curves obtained from actually measured thermal image data of the plate materials having the respective thicknesses and theoretical curves obtained from the theoretical equation of Eq. (1a) taking into consideration the heat conduction and the heat transfer (heat dissipation) on the front surface (heated surface) of the plate materials. Broken lines 230 are the temperature curves of temperature change of the front surfaces (heated surfaces) of the plate materials obtained from the actually measured thermal image data, and solid lines 231 are the theoretical curves of temperature change of the front surfaces (heated surfaces) of the plate materials obtained through curve fitting of the theoretical equation of Eq. (1a) to the temperature curves 230.

Figure 19A:
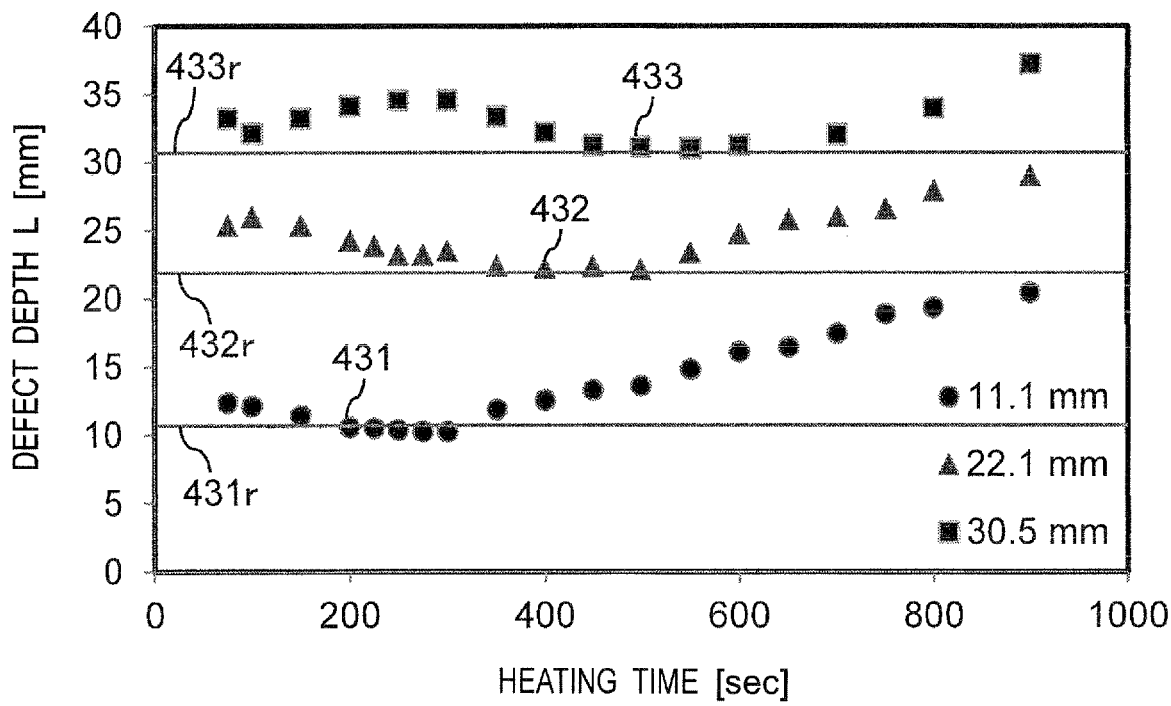
FIG. 19A is a diagram of a measurement result of a depth of a defect of an inspection object in Example 3.

FIG. 19A shows the depth L of the defects of the plate materials obtained by using Eq. (3) from the value of the parameter b in the theoretical equation corresponding to the theoretical curve obtained from fitting to the actually measured temperature curve by using Eq. (1a).

Figure 19B:
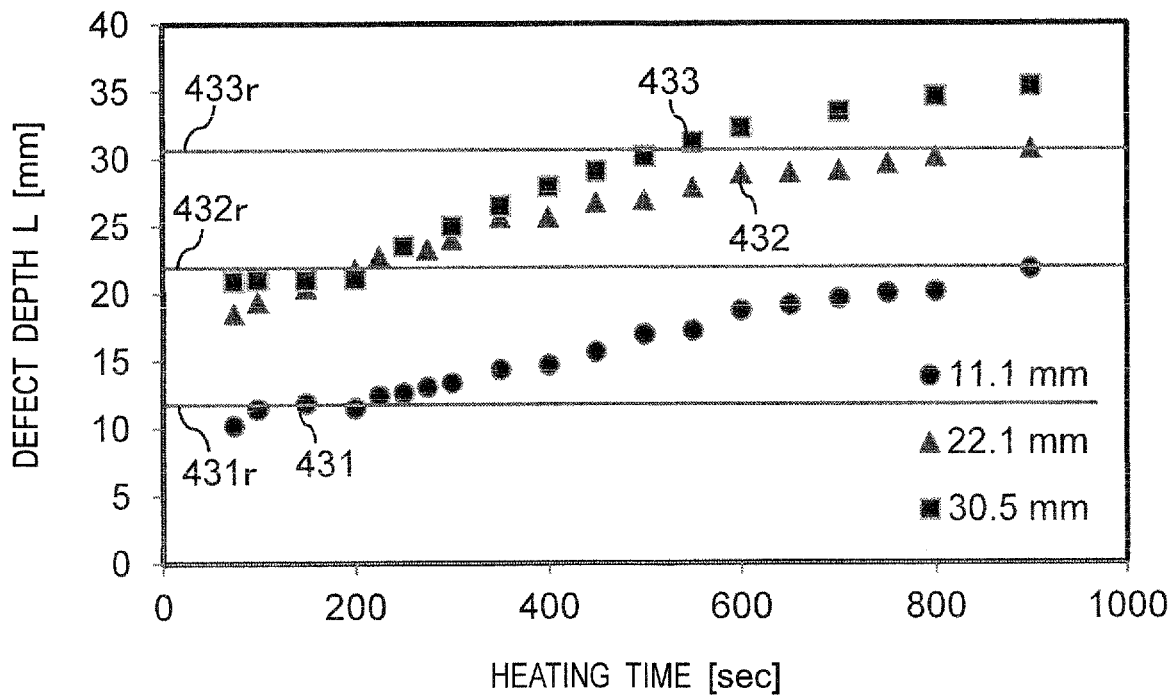
FIG. 19B is a diagram of a measurement result of a depth of a defect of the inspection object in Example 1 for comparison.

On the other hand, FIG. 19B shows the depth L of the defects of the plate materials obtained by using Eq. (3) from the value of the parameter b in the theoretical equation corresponding to the theoretical curve obtained through fitting to the actually measured temperature curve in the same way by using Eq. (1) not taking into consideration the heat transfer (heat dissipation) on the front surfaces (heated surfaces) of the plate materials, instead of Eq. (1a). FIGS. 19A and 19B include a black circle mark 431 that is a measurement result of the depth L of the defect of the plate material having the thickness (defect depth) of 11.1 mm, a black triangle mark 432 that is a measurement result of the depth L of the defect of the plate material having the thickness (defect depth) of 22.1 mm, and a black square mark 433 that is a measurement result of the depth L of the defect of the plate material having the thickness (defect depth) of 30.5 mm. Solid lines 431r, 432r, 433r indicate the actual thickness of 11.1 mm, 22.1 mm, and 30.5 mm, respectively.

According to FIG. 19B, a longer heating time generally makes a measurement result value larger. However, the measurement result (431) of the defect depth L of the 11.1-mm-thick plate material is saturated at a value close to 11.1 mm near the heating time of 200 s (shows a flat characteristic asymptotic to the solid line 431r indicative of 11.1 mm). Therefore, the defect depth L can be obtained from a value of a saturated heating time slot in the measurement result (431). On the other hand, the measurement results (432, 433) of the defect depth L of the 22.1-mm- and 30.5-mm-thick plate materials have no saturated heating time slot so that a measured defect depth becomes deeper than the actual depth as the heating time increases, which makes it difficult to obtain the depth of the defect.

On the other hand, according to FIG. 19A, the measurement result (431) of the defect depth L of the 11.1-mm-thick plate material is saturated at a value close to 11.1 mm near the heating time of 200 s to 300 s (shows a flat characteristic asymptotic to the solid line 431r indicative of 11.1 mm). Additionally, the measurement result (432) of the defect depth L of the 22.1-mm-thick plate material is also saturated at a value close to 22.1 mm near the heating time of 300 s to 500 s (shows a flat characteristic asymptotic to the solid line 432r indicative of 22.1 mm). Furthermore, the measurement result (433) of the defect depth L of the 30.5-mm-thick plate material is also saturated at a value close to 30.5 mm near the heating time of 400 s to 600 s (shows a flat characteristic asymptotic to the solid line 433r indicative of 30.5 mm). Therefore, even if the depth of the defect is increased to 22.1 mm or more, the defect depth L can be obtained from the value of the saturated heating time slot in the measurement result, and the defect depth can be measured with high accuracy.

Example 4

By using the defect detection system 1 of the fifth embodiment, a depth from a front surface to a back surface was measured as a defect depth for three mortar plate materials different in thickness (275 mm×210 mm, 11.1-mm-, 22.1-mm-, 30.5-mm-thick). The same heating device 10 as Example 1 was used.

Figure 20A:
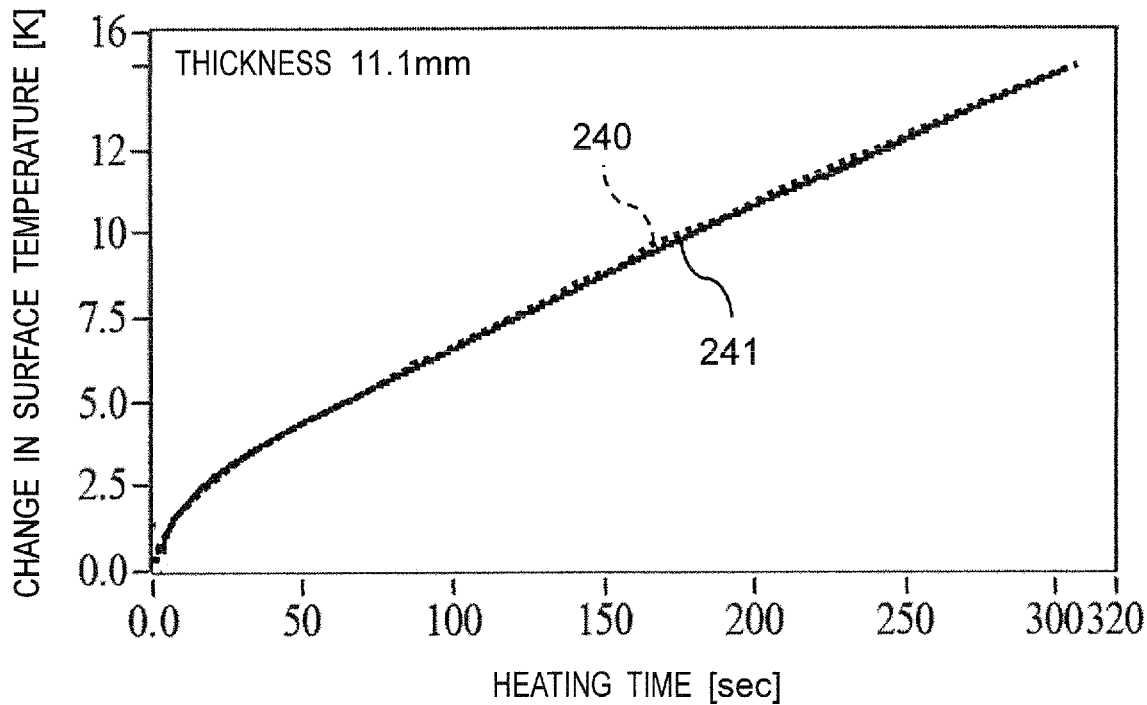
FIG. 20A is a diagram of a temperature curve obtained from actually measured thermal image data in Example 4 and a theoretical curve obtained by fitting to the actually measured temperature curve a theoretical equation taking heat conduction, heat transfer, and heat radiation into consideration.
Figure 20B:
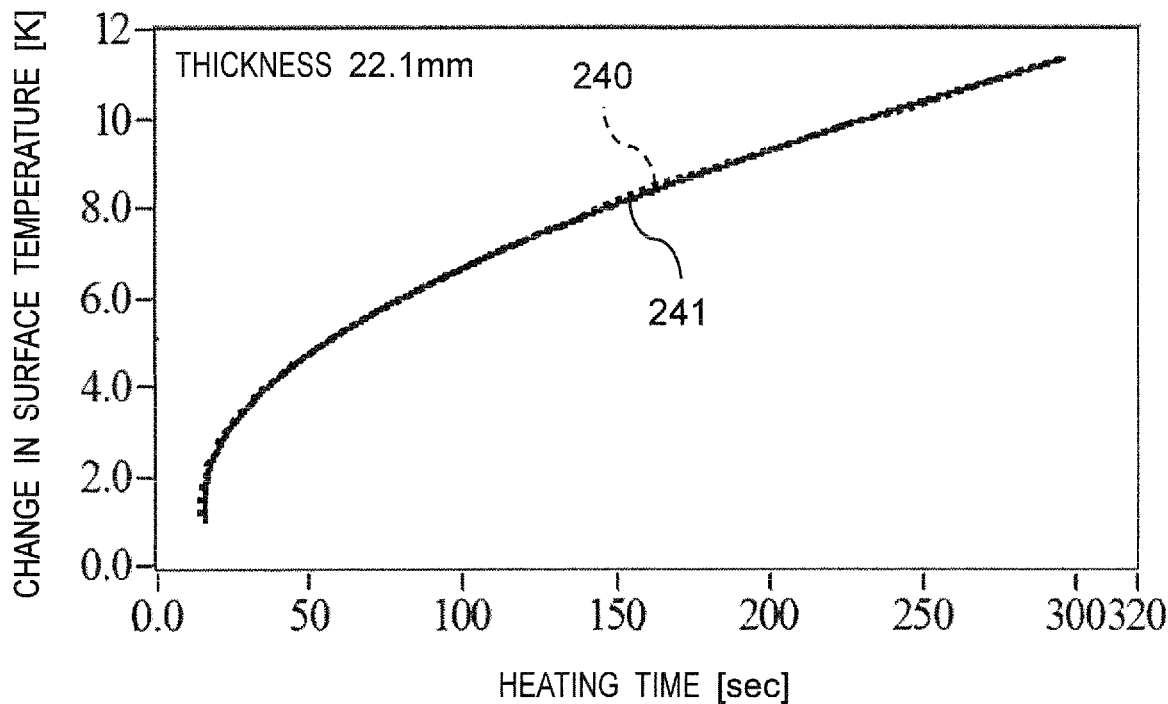
FIG. 20B is a diagram of a temperature curve obtained from actually measured thermal image data in Example 4 and a theoretical curve obtained by fitting to the actually measured temperature curve a theoretical equation taking heat conduction, heat transfer, and heat radiation into consideration.
Figure 20C:
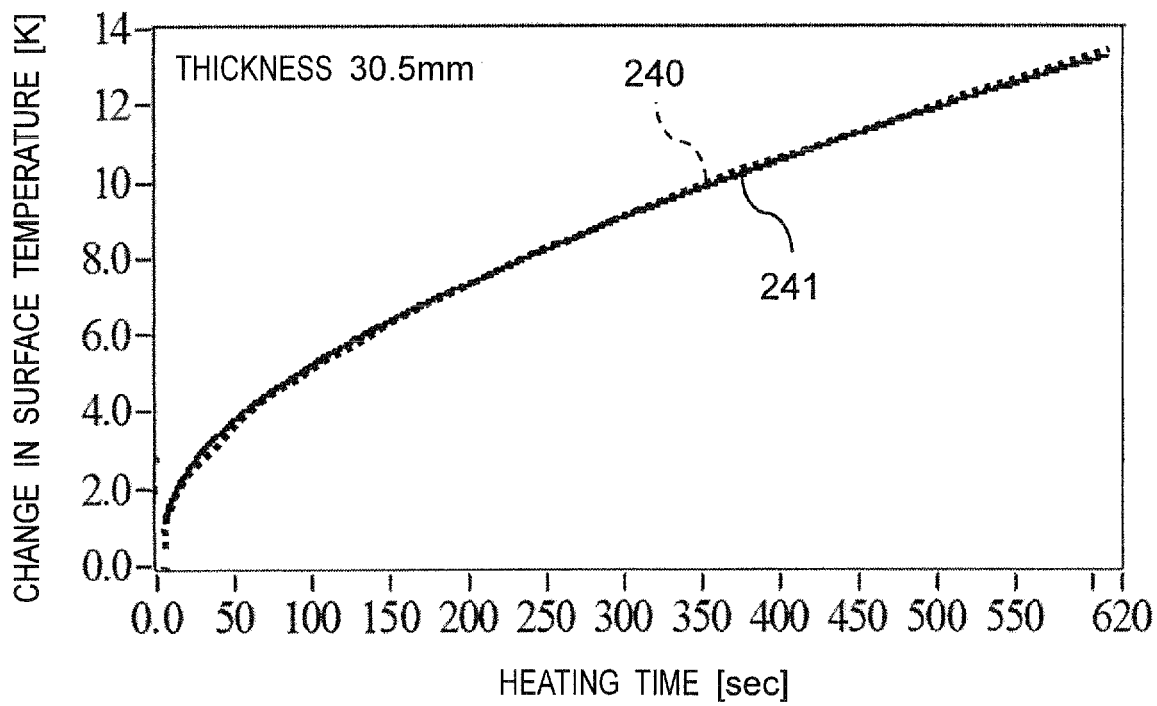
FIG. 20C is a diagram of a temperature curve obtained from actually measured thermal image data in Example 4 and a theoretical curve obtained by fitting to the actually measured temperature curve a theoretical equation taking heat conduction, heat transfer, and heat radiation into consideration.

FIGS. 20A to 20C show temperature curves obtained from actually measured thermal image data of the plate materials having the respective thicknesses and theoretical curves obtained from the theoretical equation of Eq. (1c) taking into consideration the heat conduction, the heat transfer (heat dissipation) on the front surface (heated surface) and the back surface (defect side) of the plate materials, and the heat radiation. Broken lines 240 are the temperature curves of temperature change of the front surfaces (heated surfaces) of the plate materials obtained from the actually measured thermal image data, and solid lines 241 are the theoretical curves of temperature change of the front surfaces (heated surfaces) of the plate materials obtained through curve fitting of the theoretical equation of Eq. (1c) to the temperature curves 240.

Figure 21:
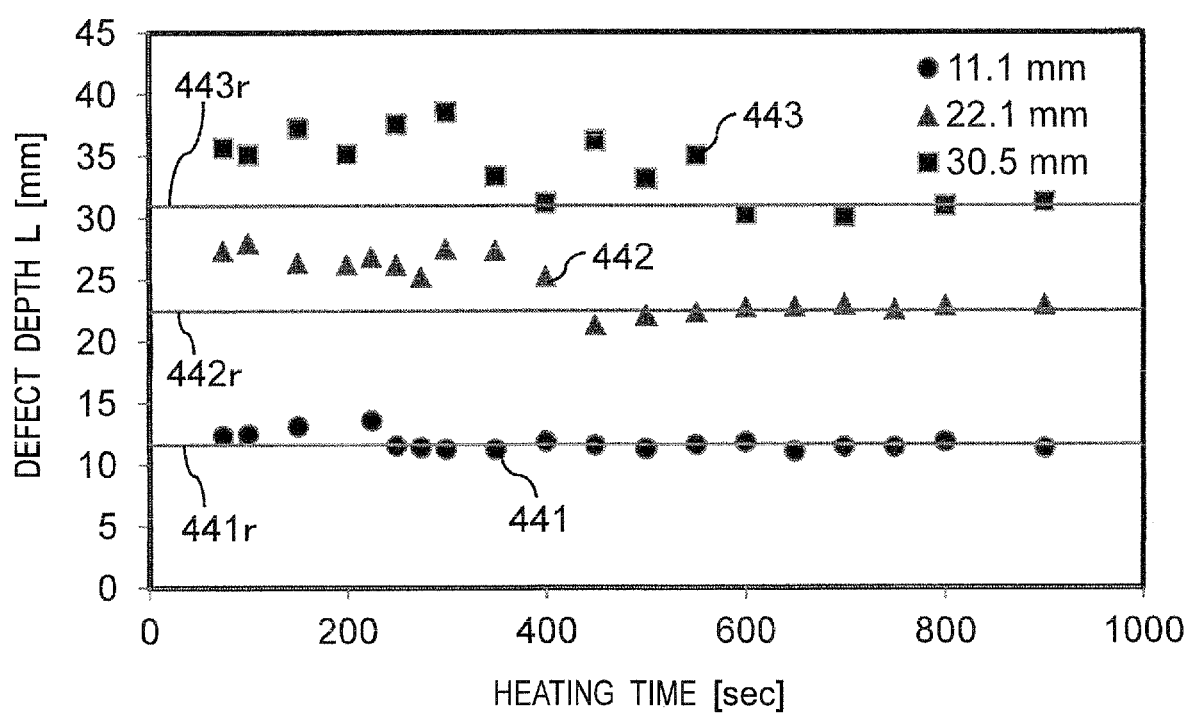
FIG. 21 is a diagram of a measurement result of a depth of a defect of an inspection object in Example 4

FIG. 21 shows the depth L of the defects of the plate materials obtained by using Eq. (3) from the value of the parameter b in the theoretical equation corresponding to the theoretical curve obtained through fitting to the actually measured temperature curve by using Eq. (1c). FIG. 21 includes a black circle mark 441 that is a measurement result of the depth L of the defect of the plate material having the thickness (defect depth) of 11.1 mm, a black triangle mark 442 that is a measurement result of the depth L of the defect of the plate material having the thickness (defect depth) of 22.1 mm, and a black square mark 443 that is a measurement result of the depth L of the defect of the plate material having the thickness (defect depth) of 30.5 mm. Solid lines 441r, 442r, 443r indicate the actual thickness of 11.1 mm, 22.1 mm, and 30.5 mm, respectively.

According to FIG. 21, the measurement result (441) of the defect depth L of the 11.1-mm-thick plate material is saturated at a value close to 11.1 mm as a whole regardless of the heating time (shows a flat characteristic asymptotic to the solid line 441r indicative of 11.1 mm). Additionally, the measurement result (442) of the defect depth L of the 22.1-mm-thick plate material is saturated at a value close to 22.1 mm at the heating time of 400 s or more (shows a flat characteristic asymptotic to the solid line 442r indicative of 22.1 mm). Furthermore, the measurement result (443) of the defect depth L of the 30.5-mm-thick plate material is saturated at a value close to 30.5 mm at the heating time of 600 s or more (shows a flat characteristic asymptotic to the solid line 433r indicative of 30.5 mm). Therefore, even if the depth of the defect is increased to 22.1 mm or more, the defect depth L can be obtained from the value of the saturated heating time slot in the measurement result, and the defect depth can be measured with high accuracy.

Conclusion of Examples 1 to 4

The results of Examples 1 and 2 reveal that when the defect depth is about 15 mm or less, the depth of the defect can relatively accurately be measured even by using Eqs. (1) to (3) taking only the heat conduction into consideration. The result of Example 4 reveals that when the defect depth exceeds about 15 mm, the depth of the defect can accurately be measured by using the theoretical equation of Eq. (1c) taking into consideration the heat transfer (heat dissipation) on the front surface (heated surface) and the back surface (defect side) of the inspection object and the heat radiation in addition to the heat conduction. However, the result of Example 3 reveals that when the defect depth exceeds about 15 mm, the depth of the defect can relatively accurately be measured by using the theoretical equation of Eq. (1a) taking into consideration the heat conduction and the heat transfer (heat dissipation) on the front surface (heated surface) of the inspection object without giving consideration to the heat transfer (heat dissipation) on the back surface (defect side) of the inspection object and the heat radiation.

INDUSTRIAL APPLICABILITY

The present disclosure is applicable to a thickness measurement method, a thickness measurement device, and a thickness measurement system for measuring a thickness of a measurement object. The present disclosure is also applicable to a defect detection method, a defect detection device, and a defect detection system for measuring a depth of a defect such as a separation or a cavity inside an inspection object.

The invention claimed is:
1. A thickness measurement method for measuring a thickness of a measurement object, comprising the steps of:
heating a surface of the measurement object by a heating device;
generating thermal image data corresponding to a temperature of the surface of the measurement object by photographing the heated surface of the measurement object at a predetermined time interval by a photographing device;
obtaining a temperature curve showing a temporal change in temperature of the surface of the measurement object based on the thermal image data generated by the photographing device;
fitting a theoretical equation derived from a heat conduction equation and including a parameter which is an unknown quantity to the temperature curve to obtain a value of the parameter; and
obtaining the thickness of the measurement object from the obtained value of the parameter,
wherein the parameter is one related to the thickness of the measurement object; and
the theoretical equation is represented by Eq. (1)

[Math 1]
$$T(L,t) = a\left(bt + \frac{1}{3} + \frac{2}{\pi^2}\sum_{n=1}^{\infty}\frac{-1}{n^2}e^{-bn^2\pi^2 t}\right) \quad (1)$$

where $T(L,t)$ is the temperature [K] of the surface of the measurement object; L is the thickness [m] of the measurement object; t is time [s]; and a and b are the respective parameters, and wherein
the two parameters a and b are represented by Eqs. (2) and (3), respectively,

[Math 2]
$$a = \frac{F_0 L}{k} \quad (2)$$
$$b = \frac{\alpha}{L^2} \quad (3)$$

where $F_0$ is a heat flux [W/m$^2$]; $\rho$ is a density [kg/m$^3$] of the measurement object; c is a specific heat [J/(kg·K)] of the measurement object; $\rho c$ is a volumetric specific heat [J/(m$^3$·K)] of the measurement object; k is a heat conductivity [W/(m·K)] of the measurement object; and $\alpha = k/\rho c$ is a thermal diffusivity [m$^2$/s] of the measurement object.

2. The thickness measurement method according to claim 1, wherein
the heating device starts heating the surface of the measurement object in a step-like manner, and wherein
simultaneously with the start of heating of the measurement object, the photographing device starts photographing the surface of the measurement object to start generation of the thermal image data.

3. The thickness measurement method according to claim 1, wherein
the theoretical equation is an equation based on a step response.

4. The thickness measurement method according to claim 3, wherein
the theoretical equation includes at least two independent parameters.

5. The thickness measurement method according to claim 1, wherein
the theoretical curve is obtained by using a nonlinear least-squares method to perform the fitting such that a residual is minimized.

6. The thickness measurement method according to claim 1, wherein
the theoretical equation includes a heat transfer coefficient related to heat transfer that is movement of heat from the surface of the measurement object to a fluid in contact with the surface.

* * * * *